US008560937B2

(12) United States Patent  
Déjean

(10) Patent No.: US 8,560,937 B2  
(45) Date of Patent: Oct. 15, 2013

(54) GENERATE-AND-TEST METHOD FOR COLUMN SEGMENTATION

(75) Inventor: Hervé Déjean, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1 day.

(21) Appl. No.: 13/155,011

(22) Filed: Jun. 7, 2011

(65) Prior Publication Data

US 2012/0317470 A1 Dec. 13, 2012

(51) Int. Cl.  
*G06F 17/27* (2006.01)

(52) U.S. Cl.  
USPC .......................................................... 715/227

(58) Field of Classification Search  
USPC .......................................................... 715/227  
See application file for complete search history.

(56) References Cited

U.S. PATENT DOCUMENTS

| | | | |
|---|---|---|---|
| 5,784,487 A | 7/1998 | Cooperman | |
| 7,392,473 B2 | 6/2008 | Meunier | |
| 7,739,587 B2 | 6/2010 | Vion-Dury | |
| 7,912,829 B1 * | 3/2011 | Mathes et al. | 707/707 |
| 8,261,186 B2 * | 9/2012 | Mansfield et al. | 715/234 |
| 2003/0123732 A1 * | 7/2003 | Miyazaki et al. | 382/186 |
| 2004/0013302 A1 | 1/2004 | Ma et al. | |
| 2006/0156226 A1 | 7/2006 | Déjean et al. | |
| 2006/0200752 A1 * | 9/2006 | Sellers et al. | 715/503 |
| 2006/0274938 A1 * | 12/2006 | Ortega et al. | 382/173 |
| 2007/0127819 A1 * | 6/2007 | Lee et al. | 382/190 |
| 2007/0180363 A1 | 8/2007 | Dance | |
| 2008/0114757 A1 | 5/2008 | Déjean et al. | |

OTHER PUBLICATIONS

Breuel. "Two Geometric Algorithms for Layout Analysis," in Workshop on Document Analysis Systems, 2002.  
Shin, et al. "Classification of document page images based on visual similarity of layout structures," In Proceedings of the SPIE Document Recognition and Retrieval VII, 2005.  
Wong, et al. "Document Analysis System," IBM Journal of Research and Development, 1982.  
Shafait, et al. "Background Variability Modeling for Statistical Layout Analysis," *Proceedings of the IEEE 19th International Conference on Pattern Recognition*, 2008.  
Ceci, et al. "Relational Data Mining and ILP for Document Image Understanding," in Applied Artificial Intelligence, 21:317-342, 2007.  
Ford, et al. Mars project: Ground truth data for document image analysis, National Library of Medicine, 2003.

(Continued)

*Primary Examiner* — Doug Hutton, Jr.  
*Assistant Examiner* — Tionna Smith  
(74) *Attorney, Agent, or Firm* — Fay Sharpe LLP

(57) ABSTRACT

A system, method, and computer program product for segmenting a document are disclosed. The method considers a zone of a document, such as a page frame or other zone which is a predetermined ratio thereof, and while there are remaining elements in the zone, iteratively tests different segmentations of the zone into n candidate columns, and computes a width of a gutter for each n-candidate. Assuming that the gutter width computed meets a threshold test, which may be based on the arrangement of the elements in the columns, and the candidate columns for the n-candidate each contain at least a threshold number of elements, elements are assigned to respective ones of n segmented columns within which they are located. For example, line elements are arranged in blocks of text within the columns, enabling a reading order for sequences of text, such as complete sentences and paragraphs, to be computed.

25 Claims, 13 Drawing Sheets

(56) References Cited

OTHER PUBLICATIONS

Haralick. "Document Image Understanding: Geometric and Logical Layout," (section 2), CVPR94.

INEX Book Structure Extraction Track—http://users.info.unicaen.fr/~doucet/StructureExtraction2009/ accessed May 18, 2011.

Liang et al. "Logical labeling of document images using layout graph matching with adaptive learning," The Fifth International Workshop on Document Analysis Systems, pp. 224-235, 2002.

U.S. Appl. No. 12/773,125, filed May 5, 2010, Déjean.

U.S. Appl. No. 12/853,461, filed Aug. 10, 2010, Déjean, et al.

U.S. Appl. No. 12/892,138, filed Sep. 28, 2010, Déjean.

Baird. "Background structure in document images," in H. Bunke, P. Wang, and H. S. Baird (editors), *Document Image Analysis*, pp. 17-34, 1994.

Nagy, et al. "A prototype document image analysis system for technical journals," Computer, 7(25):10-22, 1992.

O'Gorman. "The document spectrum for page layout analysis," IEEE Trans. on Pattern Analysis and Machine Intelligence, vol. 15, No. 11, pp. 1162-1173, 1993.

Parker. *The Aldus Guide to Basic Design*, Aldus Corporation, 1988, pp. 11-13.

Kise, et al. "On the Application of Voronoi Diagrams to Page Segmentation," In Proc. Document Layout Interpretation and its Applications, 1999.

Shafait, et al. "Structural Mixtures for Statistical Layout Analysis," The Eighth IAPR International Workshop on Document Analysis Systems, 2008.

Shaifat, et al. "Document cleanup using page frame detection," IJDAR 2008, 11:81-96.

Haralick. "Document Image Understanding: Geometric and Logical Layout," (section 2), CVPR94, 1994, pp. 385-390.

\* cited by examiner

GENERATE-AND-TEST METHOD FOR COLUMN SEGMENTATION

BACKGROUND

The following relates generally to methods, apparatus and articles of manufacture for determining logical document structure, such as the reading or viewing order of a document.

While the use of electronically created and recorded documents is prevalent, many such electronic documents are in a form that does not permit them to be used other than for viewing or printing. Reasons for this restriction include, among others, the unavailability of the document in its native format (e.g., only a scanned original of a document or a lower-level representation exists), or the deprecation or disappearance of the document's original authoring environment (e.g., document editors that are no longer available or which are inoperable on existing software platforms).

The recovery of document content (e.g., characters, words, etc.) and logical structure (e.g., viewing and reading order) thus form the basis for effective document reuse. However, when electronic documents are recovered by scanning a hardcopy representation or by recovering an electronic representation (e.g., PDF or Postscript representation), a loss of logical document structure usually results because the representation of the document is either at a very low level (e.g., bitmap) or an intermediate level (e.g., a document formatted in a page description language or a portable document format).

Geometric (or physical) page layout analysis can be used to recognize the different elements of a page, often in terms of text regions and image regions. Methods are known for determining a document's logical structure, or the order in which objects are laid out on a document image (i.e., layout objects). Such methods exploit the geometric or typographical features of document image objects, sometimes using of the content of objects and a priori knowledge of page layout for a particular document class. One particular problem which arises in this process is in the context of documents with pages which are arranged in columns. It would be desirable to identify the column structure of a page so that the textual content can be extracted in the correct order for reading.

One method for segmenting layout objects of a document image where columns may be present is known as the XY-cut method (see G. Nagy, S. Seth, and M. Viswanathan, "A prototype document image analysis system for technical journals," Computer 7(25):10-22 (1992)). This method involves finding the widest cut or the widest empty rectangle (or valley) that crosses the entire page (or block), either vertically or horizontally. The page is then segmented into blocks, which are sized to fit their content. Other methods are described in U.S. Pat. No. 5,784,487 to Cooperman and U.S. Pat. No. 7,392,473 to Meunier (hereinafter, Meunier), incorporated herein by reference; and in the following references: Roger C. Parker, The Aldus Guide to Basic Design, Aldus Corporation (1988); H. S. Baird, "Background structure in document images," in H. Bunke, P. Wang, and H. S. Baird, Eds., Document Image Analysis, pages 17-34, World Scientific, Singapore (1994); L. O'Gorman, "The document spectrum for page layout analysis," IEEE Trans. on Pattern Analysis and Machine Intelligence 15(11):1162-1173 (1993); K. Kise, et al., "Segmentation of page images using the area Voronoi diagram," Computer Vision and Image Understanding 70(3): 370-382 (1998); and Faisal Shafait, et al., "Structural Mixtures for Statistical Layout Analysis," Proc. 8th Intl. Workshop on Document Analysis Systems (2008). In general, these methods take as input a page and perform a segmentation of the content into homogeneous regions (text or image). Approaches are either top-down, such as in the X-Y cut method, or bottom-up, as in Kise, et al., and O'Gorman. Some methods such as Nagy, et al., can generate hierarchical relations among generated blocks. Meunier describes a generate-and-test approach related to the XY cut method of Nagy, et al. These methods, however, often fail to segment a page correctly due to an automatically computed threshold which is used to define a column gutter (the strip of white space between two columns). The value of this gutter (its width) is usually based on the inter-word space. The applied threshold can prevent recognition of some columns with smaller gutter widths.

There remains a need for a method for segmenting pages into columns which copes with a variety of page layouts.

INCORPORATION BY REFERENCE

The following references, the disclosures of which are incorporated herein in their entireties by reference, are mentioned:

The following relate to systems and methods for identifying document structure and content: U.S. Pat. No. 7,392,473, issued Jun. 24, 2008, entitled METHOD AND APPARATUS FOR DETERMINING LOGICAL DOCUMENT STRUCTURE, by Jean-Luc Meunier; U.S. application Ser. No. 12/773,125, filed May 4, 2010, entitled SYSTEM AND METHOD FOR UNSUPERVISED GENERATION OF PAGE TEMPLATES, by Hervé Déjean; U.S. application Ser. No. 12/853,461, filed Aug. 10, 2010, entitled OPTICAL CHARACTER RECOGNITION WITH TWO-PASS ZONING, by Hervé Déjean and Jean-Luc Meunier; U.S. application Ser. No. 12/892,138, filed Sep. 28, 2010, entitled SYSTEM AND METHOD FOR PAGE FRAME DETECTION by Hervé Déjean; U.S. application Ser. No. 12/974,843, filed Dec. 21, 2010, entitled SYSTEM AND METHOD FOR LOGICAL STRUCTURING OF DOCUMENTS BASED ON TRAILING AND LEADING PAGES, by Hervé Déjean; U.S. Pub. No. 20060156226, published Jul. 13, 2006, entitled METHOD AND APPARATUS FOR DETECTING PAGINATION CONSTRUCTS INCLUDING A HEADER AND A FOOTER IN LEGACY DOCUMENTS, by Hervé Déjean, et al.; and U.S. Pub. No. 20080114757, published May 15, 2008, entitled VERSATILE PAGE NUMBER DETECTOR, by Hervé Déjean, et al.

BRIEF DESCRIPTION

In accordance with one aspect of the exemplary embodiment, a method for segmenting a document is provided. The method includes, for a zone of a document page having a zone width and comprising a set of elements, (a) for a first iteration, segmenting the zone regularly into a number of candidate columns, a width of each of the candidate columns being function of the number of the candidate columns and the zone width, for each of the candidate columns, identifying the elements in the set which are within the candidate column, based on the identified elements within the candidate columns, where the candidate columns meet a threshold for identified elements and a gutter is found which spaces the candidate columns, assigning, to a set of segmented columns, those elements in the set which are within the segmented columns, and identifying remaining elements in the set which are not covered by the segmented columns, the segmented columns corresponding in number to the number of candidate columns and each segmented column being spaced by the computed gutter; (b) where there are remaining elements after (a), performing at least one of: i) at least one subsequent iteration which includes repeating a), wherein in each subsequent iteration, the set of elements is the remaining elements in the set, and wherein the segmenting of the zone regularly into a number of candidate columns segments the zone into a different number of candidate columns from the first iteration and all other subsequent iterations, and ii) considering the zone as a single segmented column only, identifying the elements in the set which are within the single segmented column.

In another aspect, a system for segmenting document pages in which lines of text are potentially arranged in columns, includes memory which stores pages of an input document, each page comprising at least one detected element. A page frame detection component assigns a page frame to each of a set of the pages of the input document based on bounding boxes of the detected elements for multiple pages of the document and identifies a set of elements from the detected elements for each page in the set which are within the identified page frame. A segmentation component, for each of a set of n-candidates, is configured for segmenting a zone of the page into a number n of candidate columns, the zone of the page having a width which is computed based on the page frame width. A testing component is configured for iteratively testing each of the set of n-candidates to identify an optimum width for a gutter which spaces the n candidate columns based on the positions of remaining elements from the set of elements which are within the candidate columns. While there are remaining elements in the set which are within the zone and which were not covered by a column in a prior iteration, the testing component identifies remaining elements from the set of elements that are each covered by of one of n segmented columns. Each of the n segmented columns is spaced by the gutter of the optimum width, except for when n=1. An output component outputs information based on the elements that are covered by respective segmented columns.

In another aspect, a method for segmenting document pages in which lines of text are potentially arranged in columns includes storing pages of an input document, each document page comprising at least one detected element selected from text elements and graphical elements. A page frame is assigned to each of a set of the pages of the input document based on bounding boxes of the detected elements for multiple pages of the document. For each page in the set, a set of elements from the detected elements which are within the assigned page frame is identified. For a zone of one of the pages, and while there are remaining elements in the zone from the set of elements, for each of a set of n-candidates from n=nmax to n=1, wherein n-max is a predetermined maximum number, the method includes segmenting the zone of the page into a number n of candidate columns. The zone has a width which is computed based on the page frame width. The method further includes iteratively testing each of the set of n-candidates to identify an optimum width for a gutter which spaces the n candidate columns based on the positions of remaining elements from the set of elements which are within the candidate columns. While there are remaining elements in the set which are within the zone and which were not covered by a segmented column in a prior iteration, the method includes identifying remaining elements from the set of elements that are each covered by one of n segmented columns. Each of these n segmented columns is spaced by the gutter of the optimum width, except for when n=1. Information based on the elements covered by respective ones of the segmented columns is output.

DETAILED DESCRIPTION

Figure 1:
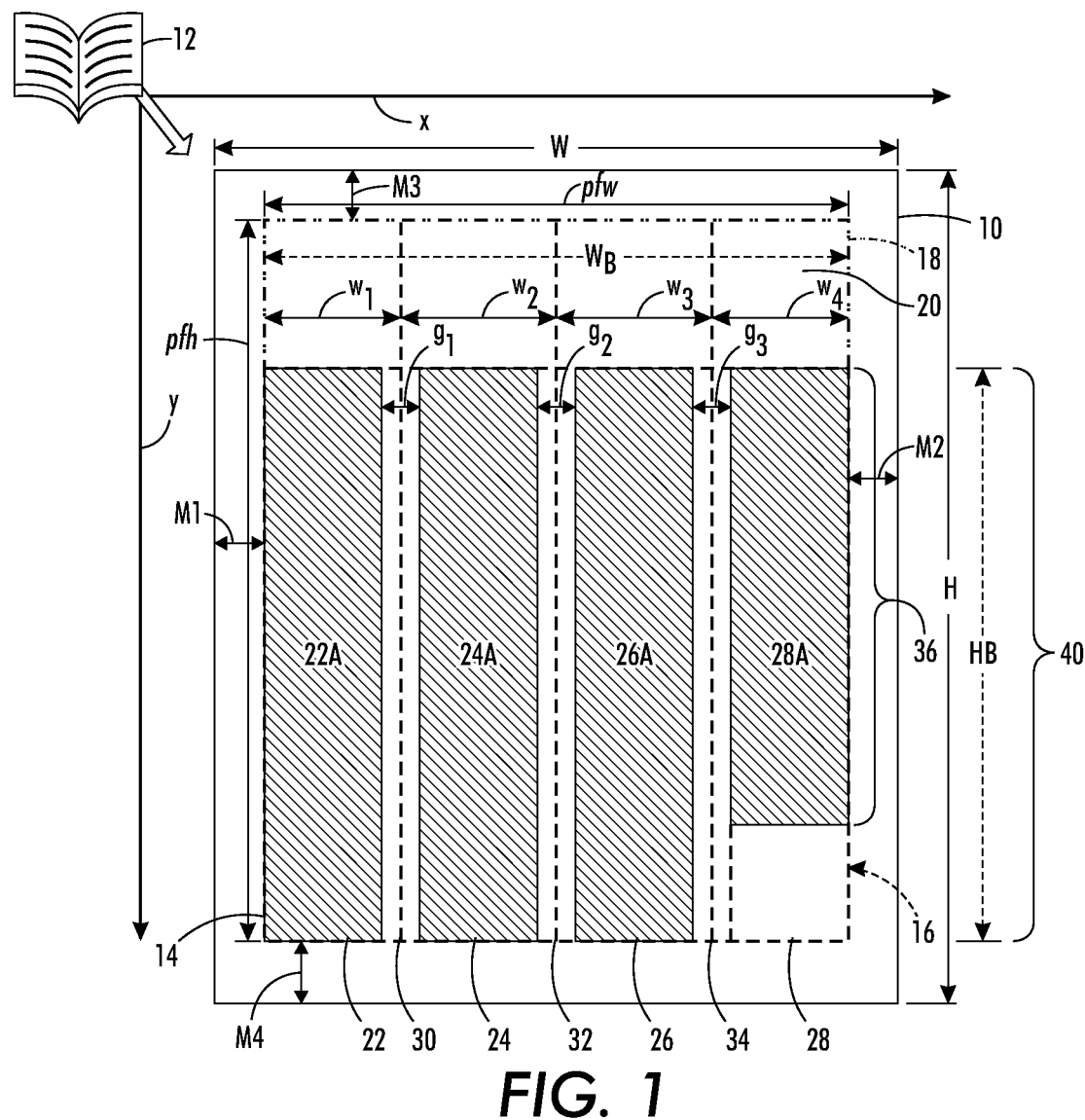
FIG. 1 illustrates a page of a document with a zone which has been segmented into columns, blocks of elements being associated with the columns.
Figure 2:
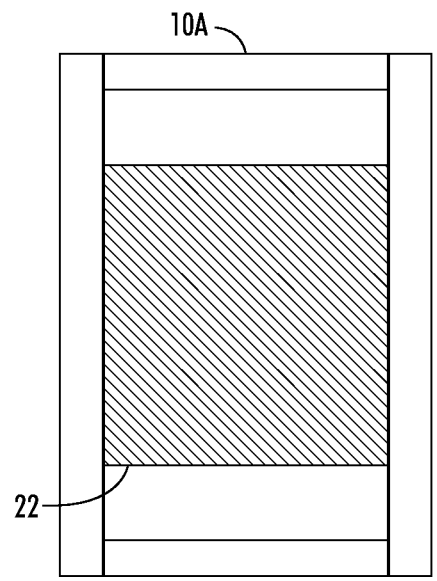
FIGS. 2-5 illustrate exemplary pages having column grids with 1, 2, 3, and 4 regular columns, respectively, where a zone of the page is equally shared between the columns and the same gutter is used between the columns.
Figure 3:
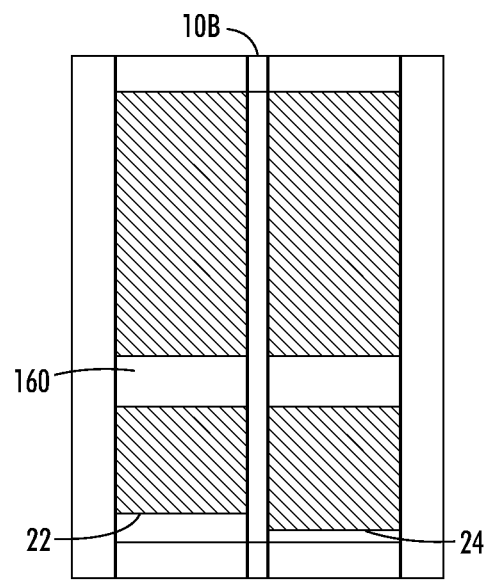
Figure 4:
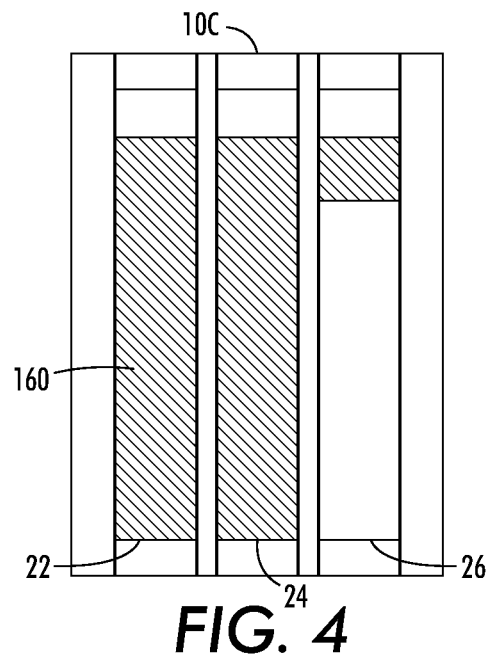
Figure 5:
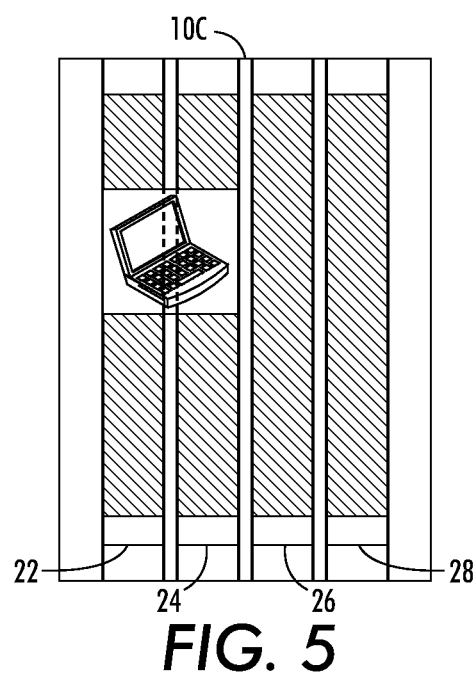

Aspects of the exemplary embodiment disclosed herein relate to a system and a method for segmenting a page into columns, where a column structure is identified. The exemplary method is based on the detection of a page frame for each page of a multi-page document, which enables the use of a page frame width ratio in the subsequent segmentation of a respective page. In one aspect, the segmentation addresses regular column sections (Method 1). This method covers specific layouts in which columns of document text are computed as a function of the page frame width, probable number of columns, and a computed gutter. The most probable number of columns is identified through an optimization process over a set of candidate column numbers. In another aspect, the method is extended to cope with more complex layouts (Method 2). In this method, a grid is applied, which allows columns to be identified based on the assumption that gutter positions are likely to be aligned with vertical grid lines, which again can be identified through optimization. Both methods can be combined into an overall method in which elements of the page which fail to be segmented with method are automatically processed with Method 2.

As input, the method takes a page and its content. Content can include detected text and/or graphic elements. A position and a bounding box of each of the content elements are known. In one embodiment, the exemplary method groups the content elements into blocks based on the column segmentation. One aim of the exemplary method is to enable lines of text, which are intended to be read consecutively, to be grouped together as columns and processed consecutively.

The exemplary method thus focuses on elements that are line elements, i.e., lines of text, each comprising a string of one or more characters.

A "document" is used herein to mean an electronic (e.g., digital) or physical (e.g., paper) recording of information. In one exemplary embodiment, a hardcopy document, such as a book, is scanned to provide a set of scanned document pages (page scans) from the same document, each page scan comprising a bitmap. At least some of the bitmaps comprise arrangements of pixels that are recognizable by an OCR engine as text (or image) elements. A scanned document can thus be a collection of multiple page scans ("pages"). The set of pages processed in the exemplary method may comprise at least four pages or at least fifty pages from a single document, and may comprise all pages of a document. The document can be of any number of pages, such as up to 1000 pages or more. The method and system are particularly suited to scanned pages. However, it is also applicable to pages in a page description language, such as PDF, e.g., which are converted to another format where some noise is introduced in the conversion. For convenience, reference will be made throughout to scanned pages which have been processed to identify content, bearing in mind that other formats are also contemplated.

A "page" is considered to be a rectangular region. The position of its elements is given relative to one or more page coordinates, such as the top-left corner (0,0) of the page. The x-coordinate value corresponds to the horizontal position and y-coordinate to the vertical position. Each OCR-processed page or otherwise generated page can be considered to contain zero or more elements, the elements including text elements (such as page headers, footers, main text blocks, lines of text, etc.) and/or graphic (non-text) elements (such as graphical objects or photographic images). In addition to the page content (i.e., elements derived from the original hardcopy document page) the page scan may also include noise, such as textual and/or non-textual noise. The textual noise (often arising from adjacent pages), and in some cases, the non-textual noise (such as vertical shadows arising from the spine between pages of the hardcopy book), may be recognized as elements of the page by the OCR engine.

A "page frame" is a (rectangular) zone of a page (approximately, the page minus computed margins) where the page content elements are laid out. The page frame is thus a complementary zone to the page margins. Together, the page frame and page margins encompass the entire page. In the exemplary embodiment, to compute this rectangle, additional information other than the current processed page is employed. The page frame is computed considering all (or at least some) of the pages of the document. Since the page frame is identified on a multiple page (e.g., overall document) basis, rather than for each individual document page, the page frame assigned to a given page may not exactly match the bounding box of the page content of that page. The page frame for a given page can thus include, within it, white space at one or more of top, bottom, and sides of the current page content elements and can exclude some elements, which are ideally elements from a neighboring page (noise). This contrasts with the conventional definition of a page frame as being the smallest rectangle which encompasses the page content elements. Page frames can be computed according to the method of above-mentioned U.S. application Ser. No. 12/892,138, filed Sep. 28, 2010, entitled SYSTEM AND METHOD FOR PAGE FRAME DETECTION by Hervé Déjean (hereinafter, Déjean).

This definition of a page frame has several advantages over existing definitions:

1) It can provide a better description of the page layout, especially by integrating white space zones into the page frame zone (this definition is also more adapted to noise detection as shown in Déjean), 2) It can be more consistent with regard to typographical concepts; and 3) It can allow for a robust and very fast method when working at the document level.

However, it is also contemplated that other methods for defining a zone for the page can be used. E.g., in the case of PDF documents, each page may be assigned a page zone of the same size.

A "zone of the page" is a rectangular region of the page which may have a width which is computed based on the page frame width. In particular, a zone of a page can have a width which is proportional to the page frame width, i.e., be a ratio of the page frame width, where the ratio is selected from a predetermined set of ratios. The widest zone of the page can thus have exactly the same width as the page frame. Its height can be equal to the page frame height.

A "column" is a vertically extending rectangle which is wholly contained within a zone of the page, such as the page frame of the page. A column includes at least one detected element. In the case of line elements, a threshold number of elements for identifying columns may be defined, such as two line elements. This means that each column in a set of at least two columns generally has a minimum of two lines of text (or at least some of the columns do). As will be appreciated, it is not necessary to consider single lines of text as columns if the primary objective is to find the lines of text which are to be read consecutively. While the description may refer generally to "columns," it is to be appreciated that until verified, the columns are properly considered as "candidate columns." Thereafter, they can be considered as "segmented columns."

A "regular section" is portion of a zone (e.g., page frame) which has the following properties: the section can be segmented into a set of columns which completely spans the zone width, the columns having the same width and using the same gutter width. The section width thus corresponds exactly to the zone width. Its height is at most the zone height. An n-section refers to a section with n columns (and hence n−1 gutters), where n is an integer.

A "gutter" is a vertical white space used as a delimiter between two columns. The gutter has a gutter width corresponding approximately to the horizontal width of the vertical whitespace (allowing for the fact that lines of text are not always of equal length).

"White space" refers to a rectangular region within a page frame which is free of elements, i.e., all pixels are white ('off').

"Segmentation" is the process of partitioning a zone in an electronic page into a number of columns.

FIG. 1 is a schematic drawing of an exemplary digital page 10 which may be generated by scanning a page of a hardcopy multi-page book 12. The page 10 has a width W in the x direction and a height H in the y direction. For convenience, x generally corresponds to the horizontal direction, i.e., the direction with which most lines of text are aligned and in which a reader normally reads the text. Page 10 includes page content 14 of a current page. OCR processing to identify the text content and non-text elements of the scanned page 10 may result in the generation of a rectangular content box 16 of width $W_B$ and height $H_B$, which surrounds the detected elements of the page content 14 of the current page (after extraction of any noise from surrounding pages). The detected elements within the illustrated content box 16 are not shown in FIG. 1 for ease of illustration.

In the exemplary embodiment, a page frame 18 of the page 10 is generated though detection of a bounding box (page content plus any noise which has been detected by an OCR engine as page content) and corresponding margins of a plurality of (i.e., some or all of) the pages in the scanned document 12 and extracting from this information, a representative rectangular page frame 18 of a determined height pfh and width pfw. This rectangle is then best fit, as far as its location is concerned, to the detected page content of page 10, which at this stage, can include page content 14 as well as noise from surrounding pages. Multiple pages are thus assigned the same rectangle dimensions, although the location of the page frame 18 on the page can vary from page to page. Further details of this method are described in Déjean. The page frame 18 thus has a width pfw and height pfh and is surrounded by margins of widths M1, M2, M3, and M4, one or more of which is generally greater than zero width, where by definition, pfw+M1+M2=W and fph+M3+M4=H. As can be seen from FIG. 1, the page frame 18 and content box 16 overlap, but need not have exactly the same dimensions, since the page frame 18 is computed for multiple pages and then best fit to the content of a given page. There can thus be one or more white space regions 20, each of which is a space between the area of overlap of content box 16 and edges of the page frame 18, i.e., in the case where $H_B \leq pfh$ and $W_B \leq pfw$. Only detected elements within the assigned page frame 18 are then considered as the content 14 of the page.

The detection of the page frame 18 is particularly helpful for scanned pages where there is noise from the adjacent page and/or margin between pages. In the case of scanned pages, using the entire page content as a zone could lead to errors in segmentation, due to the incorporation of a part of the margin(s) into the computed page zone, and thus is generally a less effective method than using the exemplary page frame to define the zone to be segmented.

In the exemplary page 10, a zone of the page 10 (here the zone is the entire page frame 18), has been regularly segmented into a number n of non-overlapping rectangular columns 22, 24, 26, 28 (here n=4) with respective widths w1, w2, w3, and w4 of the same size, and a maximum height pfh. Each column 22, 24, 26, 28 includes one or more blocks, each block comprising one or more text and/or graphical elements. In FIG. 1, each segmented column 22, 24, 26, 28 has only one respective block 22A, 24A, 26A, 28A. However, it is to be appreciated that a column may include more than one block, each of the plural blocks being vertically spaced one on top of the other and wholly contained within the respective column. In the exemplary embodiment, the blocks 22A, 24A, 26A, 28A are text blocks which are entirely text. The n segmented columns 22, 24, 26, 28 are spaced by gutters 30, 32, 34 (the number of gutters is n−1) with respective widths g1, g2, g3. Specifically, each adjacent pair of columns (e.g., 22 and 24) in the row of columns has one gutter 30 between the two columns and there is no gutter on the page frame edge of the first and last columns (22, 28) in the row. Thus, in the exemplary embodiment:

$$(w1+w2+w3+w4+g1+g2+g3)=W_B=pfw,$$

$$g1=g2=g3=g \text{ and}$$

$$w1=w2=w3=w4=w,$$

i.e., the gutters 30, 32, 34 are all of equal width and the columns 22, 24, 26, 28 are all of equal width. The columns 22, 24, 26, 28 in the row all extend over the same region 36 of the y axis for at least a portion of their height. As will be appreciated, a given page 10 may have zero columns (e.g., when there is no page content or when no columnar text is found), or one, two, three, four or more columns. For example, FIGS. 2-5 show exemplary pages 10A, 10B, 10C, and 10D, with 1, 2, 3, and 4 columns, respectively. These pages are simplified for ease of illustration.

Figure 6:
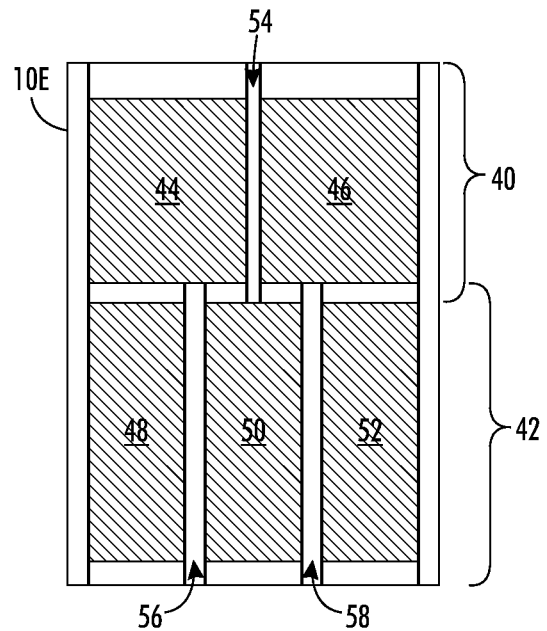
FIG. 6 illustrates an exemplary page where several sections are used in a same page (here a two-column section and a three-column section)

The pages 10, 10A, 10B, 10C, and 10D shown in FIGS. 1-5 each have only one regular section 40, as defined above. Alternatively, a page 10 may have one or more regular sections, each of the plural sections differing from one or all of the other sections in one or more of a number of columns, a column width, and a gutter width. FIG. 6, for example, shows a page 10E having two regular sections 40, 42. The first regular section 40 has two columns 44, 46 of equal width spaced by a gutter and the second section 42 has three columns 48, 50, 52 of equal (i.e., the same) width, each spaced by a gutter 56, 58, here of equal width.

The exemplary methods disclosed herein are suited to segmentation of pages having one, two or more columns, for example, where n is from 1 to 10, and to pages having one, two, or multiple sections 40, 42, as illustrated in FIG. 6, and can be adapted to pages having irregular sections having different column and/or gutter widths, as illustrated in the exemplary pages 10F, 10G, 10H, and 10J, shown in FIGS. 7-10. As will be appreciated, pages 10A, 10B, 10C, 10D, 10E, 10F, 10G, 10H, 10J can have page frames 18 generated as described above for page 10, except as noted.

In one exemplary method disclosed herein (Method 1), a zone (such as the entire page frame 18) is segmented by assuming a specific page configuration in which columns are proportional, in width, to the width of the zone 18. Specifically, the present method aims at segmenting the zone into columns by assuming that the columns segment the zone in a regular manner. The entire zone width (e.g., pfw) is segmented into columns having the same width w. The same gutter width g is used to separate the columns. Having this expectation about the page layout allows for an efficient generate-and-test approach which avoids the need for defining thresholds (e.g., a minimum gutter width) and for parameter tuning. For a given zone 18, a number of solutions (each corresponding to a number of regular columns in the zone) is generated and tested against the page. For example, each page 10 may be evaluated for a maximum number n=nbColMax of columns expected and the method iterated sequentially for smaller values of n until the page frame content has all been assigned to a column or determined not to meet the threshold requirements for a column (such as single lines of text). nbColMax may be at least 3, e.g., at least 5 and can be up to about 20, and is generally less than 40, such as about 10 columns. Thus, for example, for the page shown in FIG. 1, the method may iterate for n=10, 9, 8, 7, 6, 5, and 4. Then, at n=4, a fit is found, which accounts for at least a portion of the content 14 of the page. If the zone 18 includes a portion of content 14 which does not fit, the method may continue with n=3, 2, 1, until all content 14 of the page frame 18 (or a smaller zone thereof) is accounted for ("covered" by a column or determined not to meet the requirements for a column).

As noted above, in exemplary Method 1, the specific zone to be segmented is the page frame 18, which corresponds to the page zone in which the page content 14 is laid out and which can be computed according to the method of Déjean. In exemplary Method 2, irregular column and/or gutter widths are considered, but the page frame is still used as a basis for computing these columns by defining smaller zones which are proportional, in width, to the page frame width.

In Method 1, considering the page frame as the zone 18 to be segmented allows for segmenting documents with one or more different layouts as illustrated in FIGS. 1-5, which covers a large proportion of all documents. This also solves the problem shown FIG. 6, where the columns 44 and 46 are spaced by a narrow gutter 54 (narrower than the two gutters 56, 58 in section 42). This is a case where conventional algorithms based on thresholds typically fail to segment the page properly. Since many documents 12 do follow the regular column layouts shown in FIGS. 1-6, Method 1 can be sufficient, in many instances, to segment all pages of a document. Method 2 addresses the more complex cases shown in FIGS. 7-10. In some embodiments, Method 2 is used in cases where Method 1 cannot be applied, i.e., only for those pages or sections of pages of a document that do not fit a regular column layout. In other embodiments, Method 1 is incorporated into Method 2.

Figure 11:
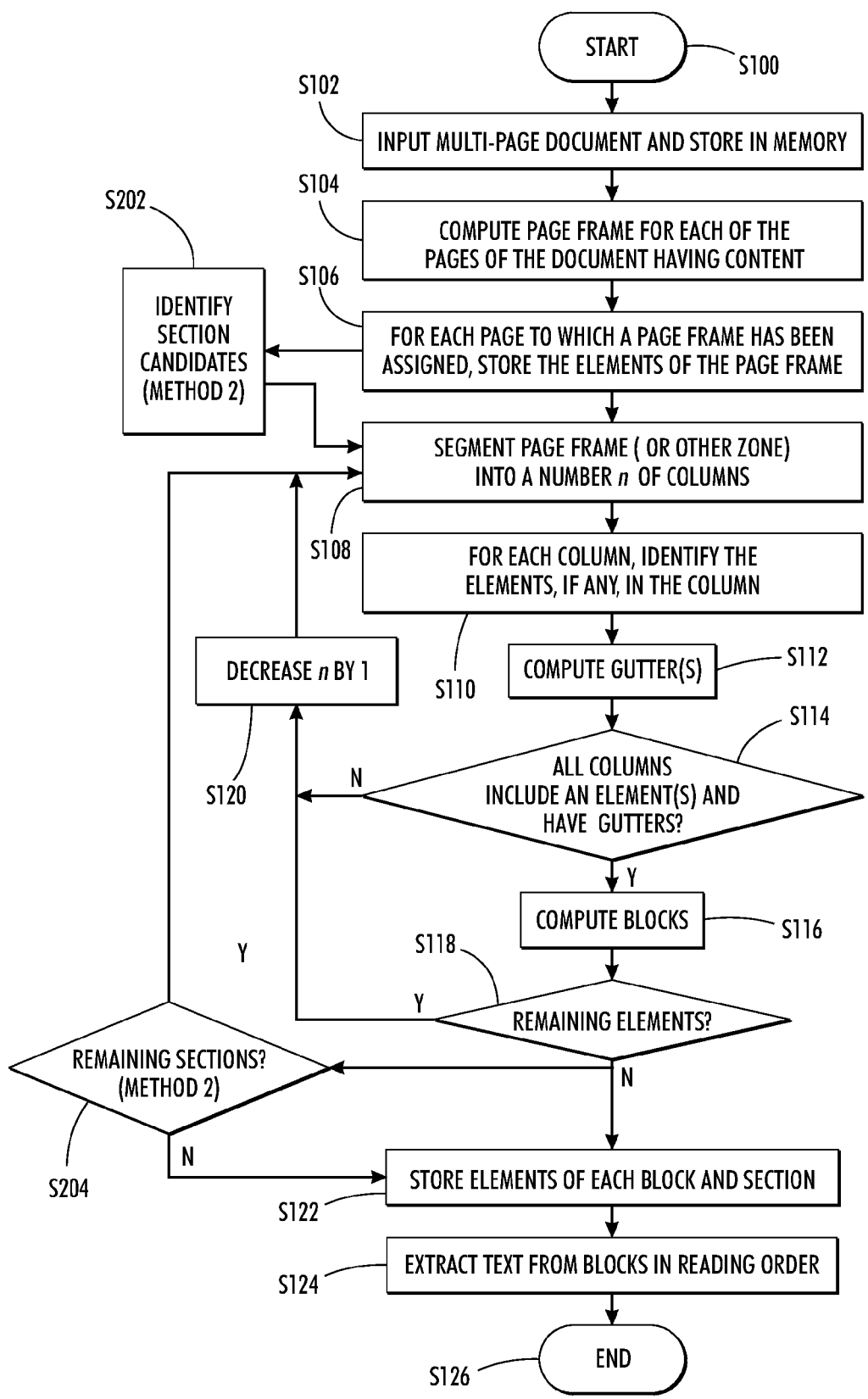
FIG. 11 is a flow chart which illustrates a method for segmentation of a multi-page document in accordance with one aspect of the exemplary embodiment.

FIG. 11 illustrates an exemplary computer-implemented method for document segmentation. The method begins at S100.

At S102, a document is input to the system having a set of pages 10 and stored in memory.

At S104, a page frame 18 is computed for each of the pages 10 of the document having content. In one embodiment, static content within the page frame, i.e., content appearing over multiple pages in the same form, such as headers and/or footers (including page numbers), is identified and excluded from further consideration.

At S106, for each page 10 to which a page frame 18 has been assigned, the elements (e.g., graphic and text elements) of the page frame (now the zone under consideration) are computed and stored. For example, the parameters of each element are stored (e.g., height and width and location (e.g., relative to the top left corner of the page)).

Figure 12:
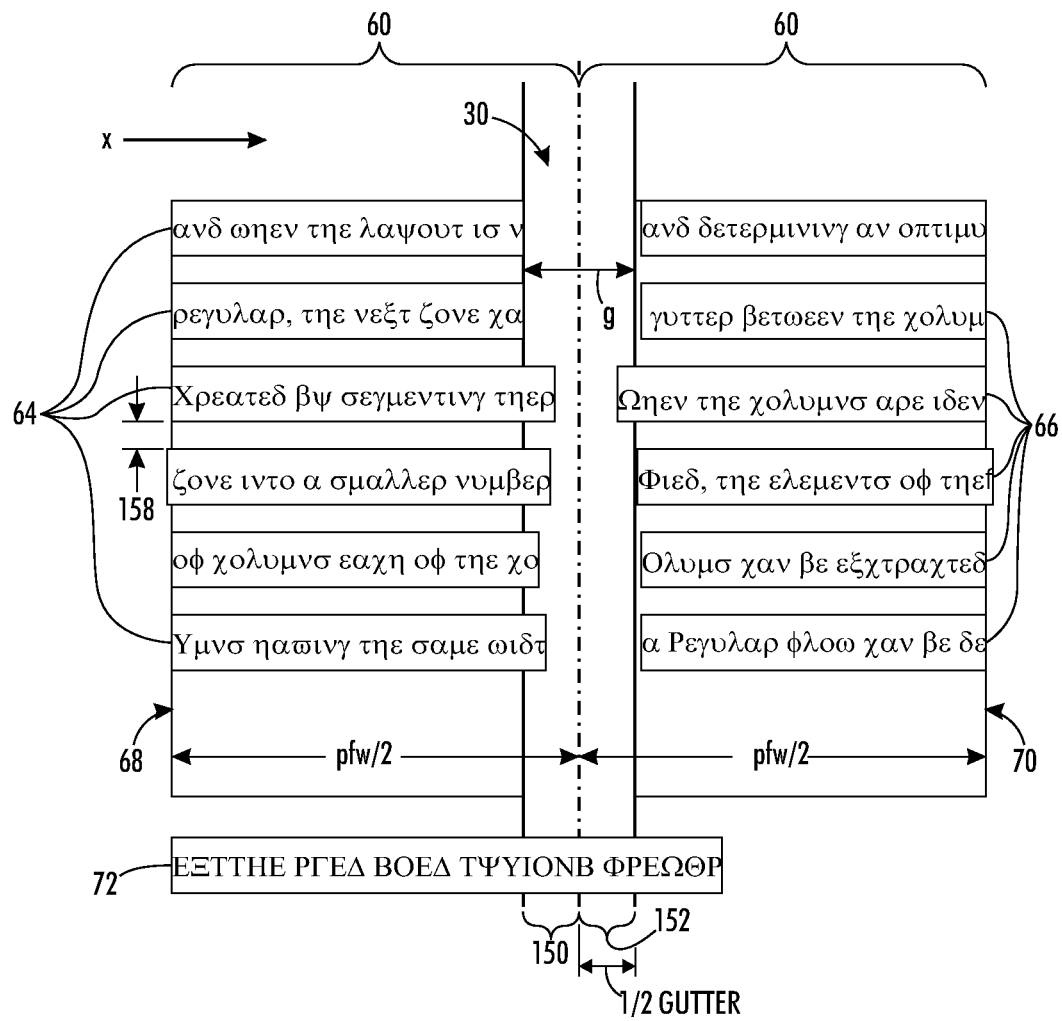
FIG. 12 illustrates two columns and a gutter in an exemplary page.

At S108, the zone 18 is segmented into a number n of candidate columns. In the first iteration, n may be the preset maximum number of candidate columns (nbColMax). At this stage, no gutters are defined. A width of each of the candidate columns is a function of the number n of the candidate columns and the zone width, e.g., the width of the candidate columns is simply computed as pfw/n, where the zone under consideration is the page frame. FIG. 12 illustrates two candidate columns 60, 62 of an exemplary page for n=2, where each candidate column has a maximum width of pfw/2 in this case.

At S110, for each candidate column 60, 62, the elements, if any, within that candidate column are identified. FIG. 12 illustrates a first set of line elements 64 which have been identified for candidate column 60 and a second set of line elements 66 which have been identified for candidate column 62 of the exemplary page 10. If the OCR engine outputs text as short elements, such as characters or words, line elements 64, 66 can be generated by considering all the short elements intersecting the same horizontal line (and generally with a significant amount of vertical overlap) and which are spaced from the next short element by less than a threshold amount, as one line element. A line element 64, 66, 72 is considered to be "within a column" if it at least partially spans the column in the width direction x and does not extend beyond the candidate column's maximum dimensions in the width direction. Thus, in FIG. 12, only the set of line elements 64 is identified as being within candidate column 60 and only the set of line elements 66 is identified as being within candidate column 62. Line element 72 is excluded from both candidate columns 60, 62. In some embodiments, both line elements and graphical elements are considered as potential elements of the candidate columns. In other embodiments, graphical elements are ignored for the purposes of segmentation.

At S112, an optimal gutter 30 (if any) is computed for the set of candidate columns, based on the sets of elements 64, 66 identified for the n candidate columns 60, 62 and evaluated to determine if the optimal gutter width meets a threshold test. If a gutter 30 meeting the threshold is not found, the output of this step is that no gutter has been found. As will be appreciated, the column width is now reduced from the maximum candidate column width $$\frac{pfw}{n}$$

to $$w = \left(\frac{pfw}{n} - \frac{(n-1)}{n}g\right)$$

and may be shifted slightly in a horizontal direction in order to accommodate the width of the gutters 30, 32, 34, etc.

At S114, the candidate columns 60, 62 are evaluated to determine if the elements they contain meet a predetermined threshold (e.g., a minimum number of elements or minimum height occupied by the elements). For example, if all n candidate columns contain at least a threshold number of elements (such as at least two line elements) and a gutter g meeting a threshold test is found, the candidate columns can now be considered as being validated, i.e., segmented columns 22, 24, etc. The requirement for a minimum number of line elements may be relaxed for the last column of a row, to account for the fact that the last column often includes the remaining text which cannot fit in the other columns in a row. Then, the method proceeds to S116, where a set of n (or more) regular blocks 68, 70 (FIG. 12) is created having the same width w and with horizontally aligned blocks 68, 70 being spaced by a gutter 30 of width g. The parameters of each block 68, 70 are stored (e.g., height, width, location of one corner) and the elements covered removed from further consideration. The method then proceeds to S118.

Otherwise, if the conditions of S114 are not met, the method returns to S108 for the next iteration. As will be appreciated, to save computation, the determination of whether all n candidate columns contain at least a threshold number of elements can be performed before S112 and, if the threshold number is not found, S112 can be omitted.

If at S118, there are remaining elements 72 of the page frame 18 which have not been assigned to a block 68, 70, the method returns to S108, where the zone 18 of the page (page frame or a zone comprising at least a portion of the page frame) covering these elements is segmented into a different number of columns. For example, at S120, the system sets n=nbColMax-1 for the second iteration, and so forth, decreasing n by one for each subsequent iteration. There thus may be at least 2, 4, 6, 8 or more of these iterations, depending on the maximum size of n and whether there are remaining elements at S118. When n reaches 1, of course, there is no further segmentation, simply an identification of whether there are sufficient elements to satisfy the requirements for a column. Otherwise, if there are no further elements which can be considered as part of a column S118, the method (in the case of Method 1) proceeds to S122.

At S122, the elements 64, 66 of each block, 68, 70, etc., are stored in local memory and/or may be output to an external device. In particular, parameters sufficient for identifying each element's location in a respective block are stored. Having identified the elements in a block 68, 70, the reading order for the column text content of the document can be identified (S124). In particular, the text content of each block can be readily extracted as a set of text strings (e.g., sentences). This can be performed by any standard method and may include ignoring the premature breaks occurring at the end of each detected line element in the block so that sentences which span two or more sequential line elements can be extracted. Sequences of text which flow from one block to another can be identified by finding the next block or column in the sequence in the same section and following a conventional path from the bottom right of one block to the top left of another. The reading order rules which allow the extracted sequences to be ordered may apply any appropriate constraints, such as that the blocks have a region of overlap on the vertical axis and/or have a top edge which is at the same vertical position (allowing for any slight OCR error in assigning a location to the top line elements).

The method ends at S126.

In Method 2, the method shown in FIG. 11 is adapted to process sections which are smaller in size than the page zone, and incorporates additional steps S202 and S204, as described in further detail below.

The method illustrated in FIG. 11 may be implemented in a non-transitory computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 11, can be used to implement the exemplary methods disclosed herein.

Figure 13:
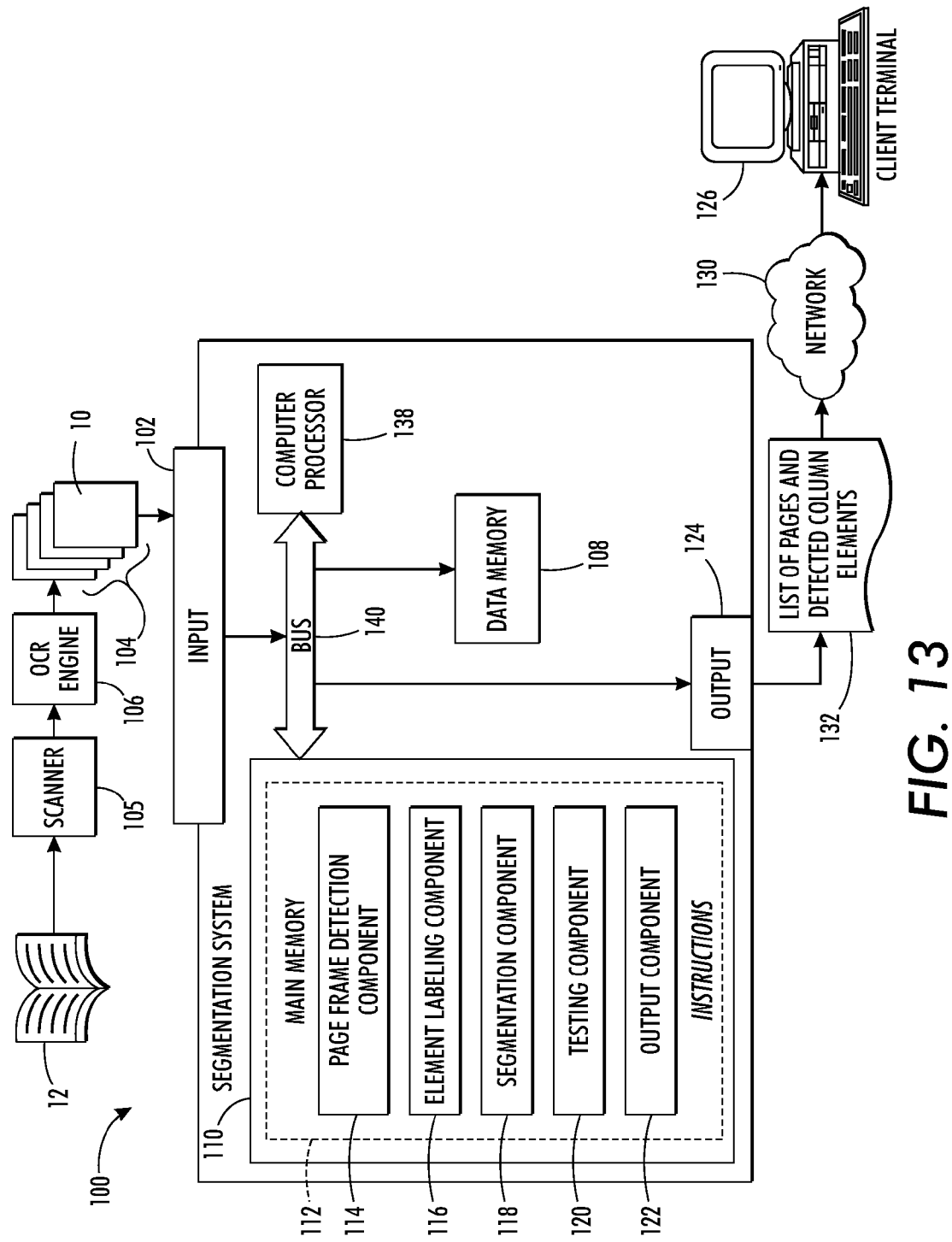
FIG. 13 is a functional block diagram of a system for segmentation in accordance with another aspect of the exemplary embodiment.

FIG. 13 illustrates a computer-implemented segmentation system 100 which can be used for performing the method of FIG. 11. The system 100 includes an input device 102, for receiving a document 12, e.g., as a set 104 of scanned document pages 10 from the same hardcopy document. In order to simplify the explanation of the exemplary system and method presented herein, it is assumed that a multi-page document 12 is input into the system 100, although the same system and method can be used to process a collection of documents. Prior to inputting, the digital pages of the document 12 may be stored in any suitable non-transitory medium, such as a ROM or RAM drive or may be input into the system 100 in the form of a carrier wave, e.g., via the Internet. In one embodiment, the hardcopy document 12 is scanned with a scanner 105 and OCR processed with an OCR engine 106 to identify candidate textual/line elements 64, 66, 72 etc. of each page (some of which may be subsequently eliminated, as noise). Alternatively, the document 12 may be generated within the system 100, itself. The input device 102 may include a modem link, a wired or wireless connection, USB port, floppy or hard disk receiver, or the like and may be separated or combined with other components of the system 100.

The system 100 includes data memory 108 for storing the document 12 during processing. Main memory 110 of the system 100 stores instructions 112 for performing the exemplary method, including a page frame detection component 114, which performs the method outlined in S104, an element labeling component 116, which performs the method outlined in S106, a segmentation component 118, which performs the method outlined in S108 (and optionally S202), a testing component 120, which performs the method outlined in S110-S120 (and optionally S204), and an output component 122, which performs the method outlined in S122. Outputs from components 114, 116, 118, 120, 122 may be stored in memories 108, 110 and/or output via an output device 124 to an external memory storage device, such as a client terminal 126, optionally through a network 130 such as a local area network and/or wide area network, such as the Internet. For example, the system outputs a list 132 of pages and detected column elements (e.g., blocks 68, 70 and elements 64, 66 of each block for each column identified) for each page 10 or other information based thereon, such as the sequences of text extracted from the blocks in reading order.

The page frame detection component 114 receives as input the set 104 of scanned or otherwise generated electronic pages 10 via the input device 102, and detects one or more page frames 18 (FIG. 1) for the set 104 of pages 10. Each page of the set (document) is assigned exactly zero or one of these page frames. In the exemplary embodiment, no page frame is assigned to a blank page and in general, there are substantially fewer page frames computed than the number of pages in the document, such that a page frame 18 is assigned to at least two, or more frequently, to several pages of the document.

In the exemplary embodiment, the components 114, 116, 118, 120, 122 comprise software instructions stored in main memory 110, which are executed by an associated computer processor 138. The processor 138, such as the computer's CPU, may control the overall operation of the computer system 100 by execution of processing instructions stored in memory 110. Components 102, 108, 110, 124, 138 may be communicatively connected by a data control bus 140. As will be appreciated, system 100 may include fewer or more components while still having the same functionality. For example, components 114, 116, 118, 120, 122 may be combined to form fewer components, or may be functionally separated to form more individual components.

The segmentation system 100 may comprise one or more specific or general purpose computing devices, such as a personal computer, PDA, laptop computer, server computer, or combination thereof. In some embodiments, system 100 may be a part of the scanning device 105 and/or may incorporate the OCR engine 106. Memories 108, 110 may be integral or separate and may represent any type of computer readable medium such as random access memory (RAM), read only memory (ROM), magnetic disk or tape, optical disk, flash memory, or holographic memory. In one embodiment, the memories 108, 110 comprise a combination of random access memory and read only memory. In some embodiments, the processor 138 and memory 108 and/or 110 may be combined in a single chip.

The input/output devices 102, 124, which may be separate or combined, allow the computer to communicate with other devices via a computer network, such as a local area network (LAN) or wide area network (WAN), or the internet, and may comprise a modulator/demodulator (MODEM).

The digital processor 138 can be variously embodied, such as by a single-core processor, a dual-core processor (or more generally by a multiple-core processor), a digital processor and cooperating math coprocessor, a digital controller, or the like. The digital processor 138, in addition to controlling the operation of the computer 100, executes instructions 112 stored in memory 110 for performing the method outlined in FIG. 11.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Further details of the system and method will now be described.

Preprocessing steps (S102) of the exemplary method can be performed with a suitable OCR processing program such as the FineReader 10.0 program, for identifying text and image elements of a page.

At least a part of the exemplary method shown in FIG. 11 may be performed with an algorithm (instructions 112). Pseudo code for performing Method 1 is shown below. In this algorithm, a rectangular zone, such as a page frame 18 or column zone 22, 24, 26 is described by four attributes: x, y, h, w, which correspond to the top-left x, top left y, height and width (pfh and pfw in FIG. 1), respectively.

---

Method 1:

1. Compute the page frame for all the pages of a document
2. For all pages p of a document:
3.     if p has a page frame:
4.         pageFrame: get the page Frame of p
5.         lElt: list of elements of p
6.         RemainingElements, lcols = segmentZone(pageFrame, lElts)

segmentZone(zone, lElts)

7. For nbcol in nbColMax to 2:
8.     lCol[nbcol] = [ ]
9.     For i in 0.. nbcol:
10.         startx = zone.x+i*(zone.w/nbcol),
11.         endx = zone.x + (i+1)*(zone.w/nbcol)
12.         Col[nbcol][i] = All elements included in this column
13.     gutter = getGutter(lCol)
14.     if all nbcol columns contain elements and a gutter was found:

---

Method 1:

15.         createBlocks(lCol)
16.         delete in lElt elt covered by lCol
17.     // test one-column
18.     return lElt, cols

---

The exemplary method aims to find out if a zone 18 of a document page 10 contains at least one regular section 40, 42, and to identify the main characteristics of the section: its number n of columns and the value (width g) of the gutter 30, 32, 34.

The exemplary method employs a generate-and-test approach which includes generating a set of (e.g., all) possible solutions for determining the number of columns in a range of possible values from nbColMax columns to two columns (e.g., nbColMax=10 columns). The test part of the method is for validation of a solution.

As noted above, the method identifies a page frame for each page (line 1), checks for a given page if it has a page frame (line 3) and computes its pageFrame dimensions (line 4), and a list lElt of its elements (line 5), S104. Page frame detection (S104) can be performed using the method of Déjean. In particular, the page frame detection component 114 receives as input the content of multiple document pages from the same document. A bounding box is computed for each page of the document. The bounding box is the smallest rectangle that encloses all of the detected elements of a page scan (a document image) of a page. The detected elements, e.g., those detected through optical character recognition (OCR), can include text elements of a current page, but can also include detected images (where the OCR processor detects images) and can include textual noise detected on an adjacent page. As will be appreciated, for a given scanned document page, the bounding box may be smaller or larger than the assigned page frame. The page frame detection method also determines the margins for each page (i.e., the left, right, top and bottom margins) between the computed bounding box and the outer perimeter of the page. The method then computes a first histogram based on the bounding box dimensions for all of the document pages, and a second histogram based on the margin dimensions for all of the document pages. A "computed page frame" is then generated for the document by identifying, from the histogram, frequent bounding box dimensions and frequent page margins from the first and second histograms. The computed page frame is then compared to some or all of the document pages, and any pages that are deemed to match the computed page frame are then linked with the computed page frame. For each page that is linked to a given page frame, the page frame is positioned on the page to best fit the content of that page. This means that each page that is linked to a given page frame has a page frame 18 of the same height (pfh) and width (pfw) (FIG. 1), although the margins may have different dimensions, as a result of the positioning of the page frame on the page. Since a single document may have multiple page frames, the process described by Déjean may be repeated one or more times, if necessary, to match different computed page frames with the remaining pages of the document. The output of the page frame detection component 116 is, for each page 10 of the input set 104 of pages, at most one page frame 18 linked to that page 10. Each page frame may be defined by its width pfw, height pfh and, with respect to a given page, its location relative to the boundaries of the page 10.

The method of Déjean takes account of the fact that scanned pages often include noise which arises from the spine of the book being copied or from the next page to the one being scanned. By computing page frame dimensions (height pfh and width pfw) over multiple pages, these noisy portions of the page content which fall within the bounding box can be excluded from the computed page frame.

Remaining elements RemainingElements and a list of columns lcols are generated at line 6. In the first iteration, the remaining elements are all the elements in list lElt and no columns are yet listed in lcols. The segmentation of the zone begins at line 7, where for each current tested number of columns (referred to as the n-candidate, where n corresponds to the number of columns), the zone 18 is vertically segmented into n column zones of equal width (S108). This is expressed in lines 10 and 11, where the start and end of each candidate column, in the x direction, are identified. Elements 64, 66 of the page occurring in these columns 60, 62 are collected for each column (line 12). To be considered, an element has to be entirely included in the column. Thus, for example, element 72 in FIG. 12 is not considered a part of either column 60 or 62, since it is not contained within the width W/2 of either.

The gutter 30 for the n-candidate is evaluated (getGutter) (line 13). When no appropriate gutter is found at S112, a specific value is returned, which invalidates the n-candidate. An algorithm for identifying an optimum gutter is described below.

Then, the n-candidate is assessed against its content. If all columns have at least a minimum number nbMin of elements 64, 66 (nbMin can be at least 2, e.g., nbMin=2 for line elements) and if a gutter was found at S112, then the n-candidate is validated and the elements occurring in the columns are considered as covered (they are not considered for further n-candidates). Only elements occurring completely in a respective column 60, 62 are considered. In order to deal with noise (e.g., from OCR, but also from the page frame computation), a respective left or right gutter zone 150, 152, or a portion of it, is considered as part of the column 60, 62 (e.g., half of the gutter width, see FIG. 12) in this step. For a column which has both left and right gutters, such as column 24 in FIG. 1, the corresponding right and left gutter zones of the two gutters 30, 32 are considered as part of the column in this step.

Blocks of elements are created at S116 based on the elements of the columns (line 15). The elements intersecting a given column (e.g., the six elements 64 and element 72 intersecting, i.e., at least partially within, column 60) are collected and sorted vertically. A block 68, 70 corresponds to a set of contiguous elements in a column that are completely included in that column. A block stops when an element which is not completely contained occurs (e.g., element 72 is not a part of column 60 and therefore terminates block 68). A new block starts when there is no current block, and when a new element contained in the column is found. Horizontal whitespace strips 160 (FIG. 3) can also be used in order to stop a block. Only whitespace strips 160 whose width corresponds to the zone width are considered for this purpose. Their minimal height is automatically computed, e.g., as twice the leading value (interline space 158) of adjacent column line elements (FIG. 12).

Thus, in the case of FIG. 12, elements 64 are completely contained within the width of column 60 and are all considered part of block 68, and elements 66 are contained within the width of column 62 and are all considered part of block 70. The line elements 64, 66 covered by the blocks in the list of n columns are then deleted from the list of elements (i.e., are not considered in further iterations).

The method returns to line 6 for the next iteration, where the zone is segmented into a lower number n of candidate columns and proceeds this way until the n=2 candidate has been tested.

If no regular section with at least two columns is found, then a test is performed to evaluate the one-column section hypothesis (line 17). This test may be performed out of the generic loop since no gutter is used in this configuration. A zone is considered as a one-column zone if an element width is greater than half of the zone width. For documents such as newspapers, the remaining elements not covered by the previous steps often correspond to titles or subtitles which do not have the minimum number of line elements (e.g., two) to be considered a column.

The gutter width g can also be computed (S112, line 13) using a generate-and-test approach. In the exemplary embodiment, each value of a set of solutions in a given range is tested to find an optimal width of the gutter. For example, at least 3 or at least 5 different gutter widths are tested and in one embodiment, at least 10 different gutter widths are tested which cover a suitable range. The gutter values tested can range, for example, from less than one character width to about ½ pfw/n, or any other suitable range (which is less than the maximum column width, here pfw/n). By way of example, the minimum gutter tested can be at least 1 mm or at least 1.5 mm. For example, a minimum gutter tested can be at least 2, 4 or 6 points, where each point corresponds to about 0.3 mm. The maximum gutter can be substantially wider than the typical gutter expected, e.g., at least 5 mm or at least 10 mm. In one embodiment, the gutter sizes tested are from 6 to 40 points in increments of two, corresponding to 1.8-24 mm. This is generally suitable for 12 point font, and other commonly used font sizes, however, other ranges could be employed for different sizes of font.

The values can be evaluated using a heuristic as follows: the best (optimum) gutter in the set is the one that generates the most regularity in terms of the x-coordinates of the elements in the candidate columns. This means that the same kind of indentation is used in the different columns. For example, the candidate gutter which is aligned closest to the left edge of the lines in the columns, as computed by a suitable metric, is considered as the best gutter. This approach is more robust to noise and also better able to cope with different alignments (especially left-aligned elements) than considering the bounding box of the elements. If the optimum gutter value does not at least equal a threshold value, no gutter is found.

Pseudo code for an exemplary algorithm for computing the gutter (line 13 of Method 1, S112 in FIG. 11) is given below:

getGutter(zone,lCol,nbCol):

```
19.   max = 0
20.   maxgutter = None
21.   for gutter in [minGutter, maxGutter in increments of
      2]:
22.       colwidth = (zone.w − (gutter*(nbCol−1)))/nbCol
23.       XHistogram=[ ]
24.       for i in lCol:
25.           startx = zone.x + colwidth*i + (gutter * i)
26.           for all elements elt in lCol[i]:
27.               eltIndent= elt.x − startx
28.               store eltIndent in XHistogram[i]
29.       // elements must occur in all columns
30.       if len(lHisto) == nbCol:
```

-continued

```
getGutter(zone,lCol,nbCol):
31.        // compute the sum of each indent value over
               all columns
32.        for each col i:
33.            for each indentValue in XHistogram[i]
34.                lIndentValue[indentValue] +=
                       Xhistogram[i][indentValue]
35.        // update best gutter
36.        sum = 0
37.        for indentValue in lIndentValue:
38.            if indentValue occurs in all columns:
39.                sum += lIndentValue[indentValue]
40.            if sum > max:
41.                maxgutter= gutter
42.                max = sum
43.    return maxgutter
```

Figure 14:
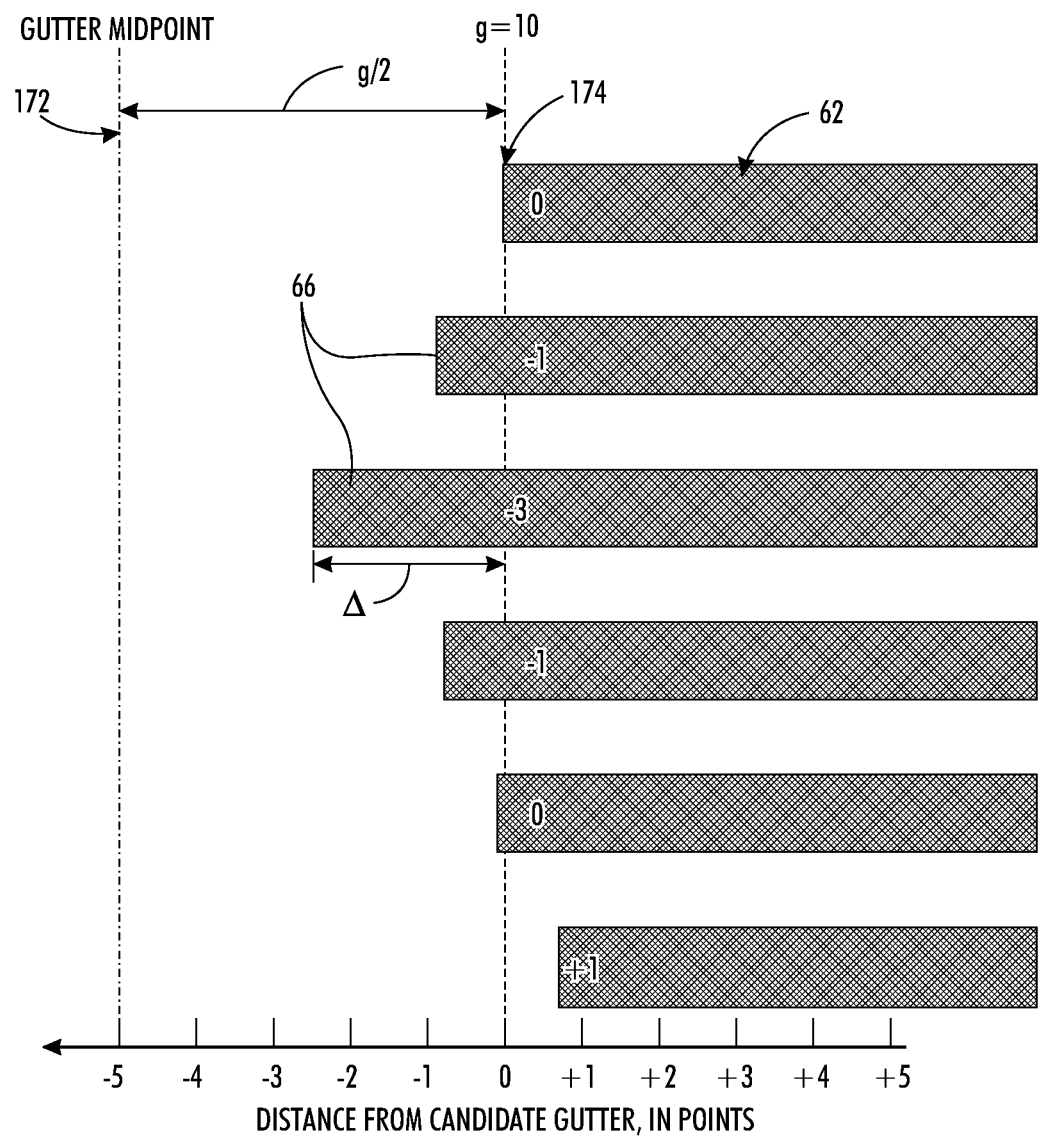
FIG. 14 illustrates elements of a column during computing a value for a candidate gutter width.
Figure 15:
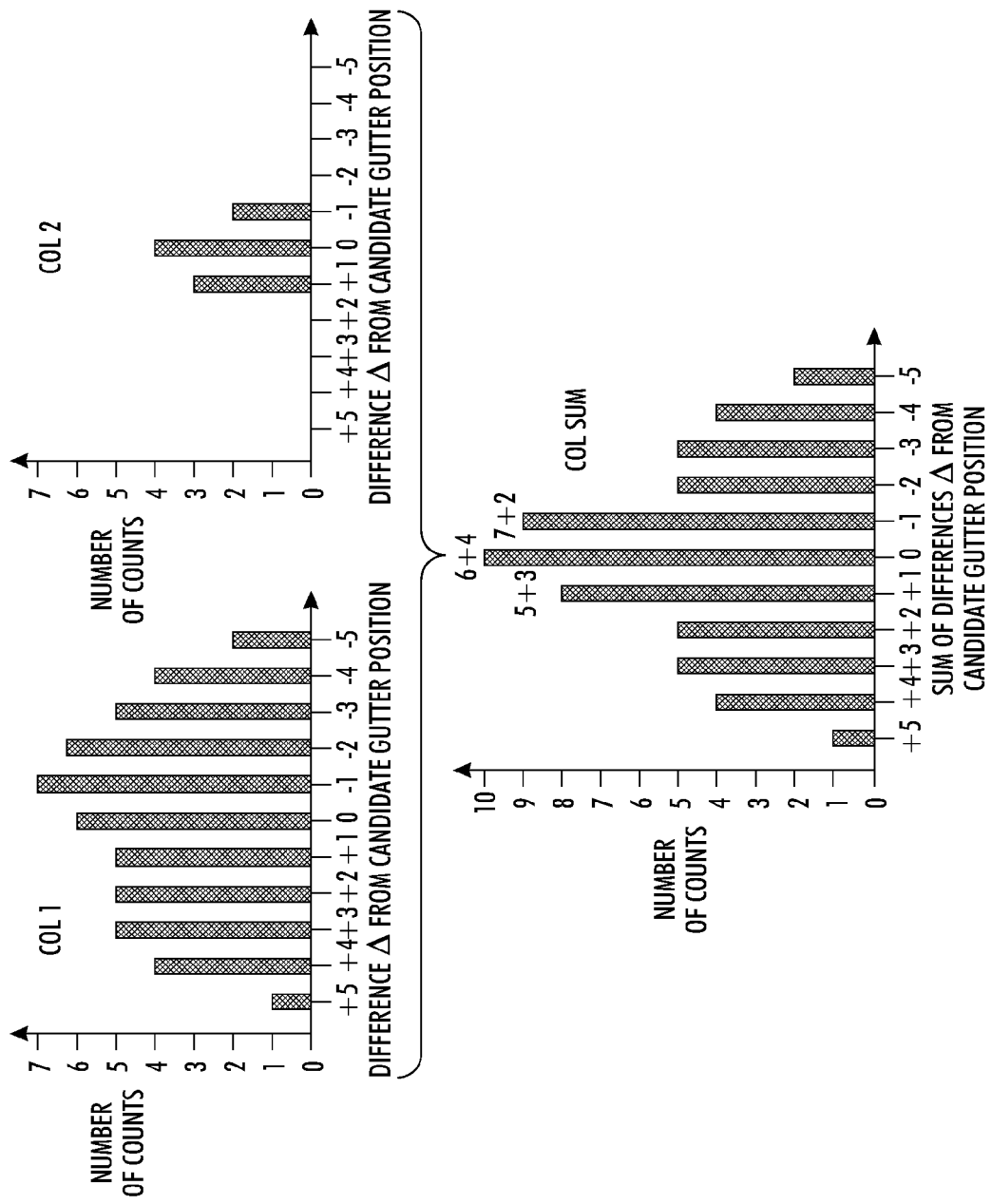
FIG. 15 illustrates a histogram of differences for the elements of FIG. 14 in a set of columns for computing a candidate gutter width.

Briefly, the algorithm shown in lines 19-43 above, which is applied in line 13 of the Method 1 algorithm (step S112), is initialized with a maximum (max) of 0 for the sum (line 19) and no maximum gutter (maxgutter) (line 20). At line 21, starting with a minimum gutter (mingutter), in increments of 2 points, the column widths are computed by subtracting the total width of the n−1 candidate gutters from the zone width (zone. w) and dividing the result by the number of columns (nbCol) (line 22). At line 23, a histogram is created. This is a histogram of differences between the start of the line elements of all the columns in a section and a candidate gutter width for each of a set of candidate gutter widths. First, the new start positions of each of the n columns are computed, which accounts for the candidate gutter width(s) (line 25). For example, as shown in FIG. 14, for a part of a column 62, and a candidate gutter width of 10 points (i.e., extending 5 points on both sides from the midpoint 172 of the candidate gutter) the start position of the column 62 should occur approximately at 174 (if this gutter is optimal). The left hand indent eltIndent for each line element from this position 174 is then computed (line 26). A difference $\Delta$ from the candidate gutter position 174 can then be identified for each of the line elements 66, by subtracting the column start position 174 from the line element's actual start position (e.g., as measured in points) (line 27). These differences $\Delta$ are shown in FIG. 14 on the respective elements. For example, the first line element which starts 5 points to the right of the gutter midpoint 172 (i.e., on the column start 174) has a difference of 0 for this candidate gutter. By computing all the differences $\Delta$ for each of the columns where there is a gutter at the left hand edge, a histogram can be generated for each column, as shown in FIG. 15 (line 28) Here histograms for a two column candidate are illustrated by way of example (COL 1, COL 2). For each histogram, the number of counts for each difference $\Delta$ is shown. Assuming that each column includes a threshold number of elements (lines 29-30), then a sum is computed as described in lines 31-39. In particular, a final histogram (labeled COL SUM in FIG. 15) is created by adding the counts for each of the differences of all the column histograms (lines 32-34). This global histogram gives the frequencies (here in counts) for the gutter position over all columns. The sum for each difference $\Delta$ for that candidate gutter position thus corresponds to the sum of the histogram values for the difference $\Delta$ from each of the column histograms (line 39). In the example shown in FIG. 15, in the global histogram, COL SUM, the count for a zero difference $\Delta$ is simply the sum of 6+4=10 counts.

The maximum value sum corresponds to the maximum number of counts in the global histogram. In the illustrated case, 10 (at $\Delta$=0), is the maximum value over all the summed counts (lines 37-39) and becomes the sum. If this sum is higher than the current maximum sum (max) of the previous gutter values tested (or 0 for the first iteration), this sum is the new maximum sum max and the selected gutter value (maxgutter) is considered as the best gutter value (lines 40-41).

The method is repeated with other candidate gutter values to determine if there is a better gutter width (i.e., when there is a sum of the counts in the global histogram which is greater than the current max). For example, if the sum for all the other gutter values tested were to be less than 10 in the illustrated example, then the candidate gutter width used in this iteration (10 points) would be the selected optimal gutter maxgutter.

A threshold test can be used in order to validate the optimal gutter width: for example, the sum at line 42 has to be greater than a minimal value for a gutter to be found, e.g., at least 2. The threshold thus corresponds to the minimal acceptable value for the final frequency (here in counts). In the case illustrated in FIG. 15, the maximum sum sum is 10, which is greater than 2, so the threshold test is satisfied. If no gutter is found, a specific value may be returned which is used in the test line 14.

The above method, outlined in the algorithm, is simply one way for generating an optimum gutter value by testing a set of candidate gutter values to identify the one which best fits the lines of text in each column. In other embodiments, the method could be simplified by generating only one global histogram (COL SUM) for each candidate gutter value, i.e., without generating the individual column histograms (COL 1 and COL 2). In the exemplary method, for the left hand column in a row (e.g., column 60 in FIG. 12), although there will be no actual gutter generated for this column, an imaginary gutter can be created for purposes of computing the selected optimal gutter maxgutter. Thus, in the illustrated example, COL 2 may correspond to a column such as column 60. In other embodiments, the left-most column could be excluded from the computation.

As will be appreciated, this method for computing and testing an optimal gutter considers only the left hand edges of the column line elements. This is because the right hand elements can be quite variable, particularly in the case of non-justified text, but also at the end of paragraphs of justified text. However, in some embodiments, e.g., where text is right justified, it may be appropriate to consider the right hand edges as well as or in place of the left hand edges in computing the gutter. Moreover, other methods for computing/testing the gutter are also contemplated. For example, a bounding box may be placed around the lines of text and/or other elements of each column and the average spacing between the boxes determined. If a threshold spacing is not found, no gutter is found.

Method 2: Segmentation of Complex Page Layouts

Method 1, described above, works well for layouts such as those illustrated in FIGS. 1-6. FIGS. 7-10 show more complex page layouts which are not readily covered by Method 1, i.e., will likely produce some errors in the output reading order. In these examples, most of the sections do not cover the page frame width. In this embodiment, other zones than the page frame can then be considered.

Figure 7:
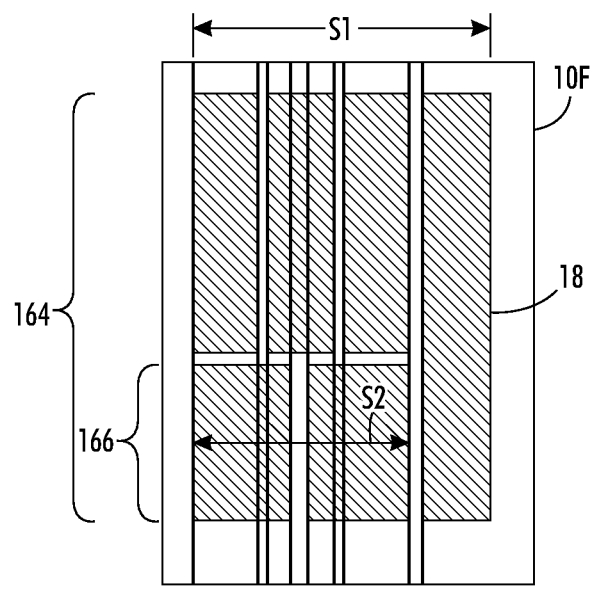
FIGS. 7-10 illustrate exemplary pages having irregular column grids, where a zone of the page has columns of different widths and/or different gutters.

By way of example, FIG. 7 shows a case where several sections are used in the same page. While the four-column section 164 is covered by Method 1 (its width S1 corresponds to the page frame width), the two-column section 166 does not correspond to the page frame width but to a proportion (e.g., a ratio) of it. This section has a width S2 which is obtained by deleting one column of the four-column section 164.

By "ratio", it is meant that the width S2 of a section or other zone under consideration which is smaller than the page frame width has a width of from 1 to m−1/m of the page frame width pfw, where m is in the range of 2 to nbColMax (e.g., in the range of 2-20). The ratio under consideration can allow a small amount of variability for scanning errors, e.g., less than 5 points. Values of m considered are generally selected from among the values of n.

Figure 8:
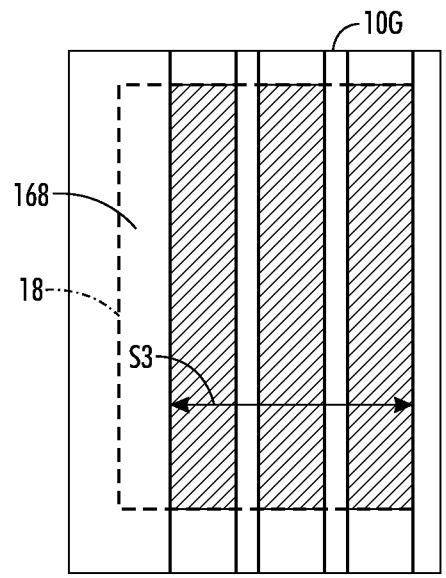
Figure 9:
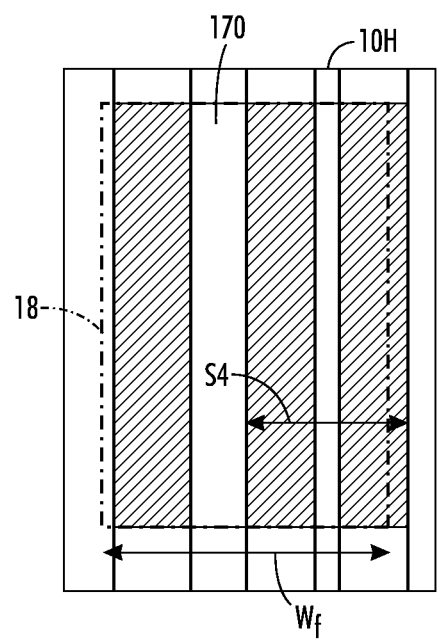

FIGS. 8 and 9 show other complex cases. In both examples, section widths S3, S4 do not correspond to the page frame width pfw and some large whitespaces 168, 170 are used inside the page frame 18. Such a layout is typical of weekly newspapers and magazines. These whitespace zones 168, 170 are referred to herein as intra-margin whitespace zones. Intra-margin whitespace zones can be located at the left and right edges of the page frame 18, or located inside it (FIG. 9), generating a large whitespace inside the page frame. Intra-margin whitespace zones 168, 170 are often used to lay out captions. The width of the intra margin whitespace zone 168, 170 generally corresponds to a ratio (as defined above) of the page frame width. Thus, for example the white space width may be 1/9 or 2/7 of the page frame width.

Figure 10:
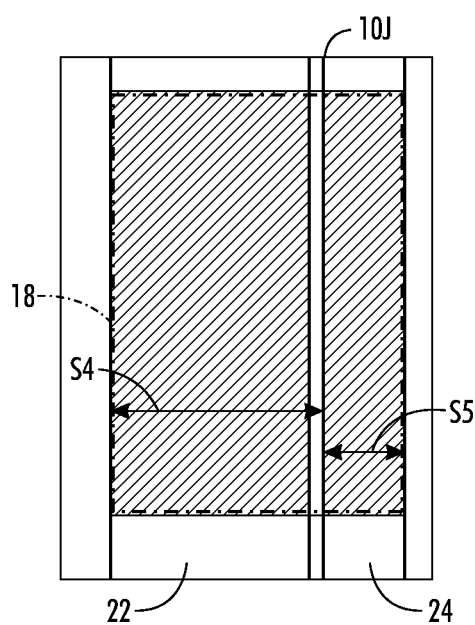

FIG. 10 shows a page layout where the page frame 18 is composed of two columns 22, 24 of different widths S4, S5. The two column widths are a complementary ratio of the page width (here, 1/n and 1−1/n). This page can be considered as being composed of two one-column sections of widths S4 and S5, where S5 is measurably less than S4. Such a layout is characteristic of the presence of marginalia (the narrower column 24 is used to lay out marginal notes). The exemplary separation corresponds to a two-thirds/one-third ratio. In the case of marginalia, a ratio 1/7 is often used for the marginalia column 24.

In order to cope with such complex page layouts, the page 10 can be decomposed into zones in which content is laid out using regular sections, where a section can be smaller in width than the page frame and a zone can encompass one or more sections. For example, in FIG. 7, the two-column section 166 does not cover all the page frame-its zone width corresponds to a 3-column section of the page frame. The page frame zone 18 encompasses two sections 164 and 166.

Referring once more to FIG. 11, the additional steps which may be performed in Method 2 include S202 and S204. At S202, candidate sections of the page frame are identified and the line elements of the page frame are assigned to the identified section candidates. Thereafter, the method proceeds to S108, where the zone under consideration corresponds to a selected one of the identified section candidates and the elements considered are those entirely within that zone. The method then proceeds analogously to Method 1 from S110 to S118. Then, the method proceeds to S204 when there are no remaining elements under consideration in the section candidate. Where there are additional section candidates at S204 containing elements which have not yet been assigned to a block, the method returns to S108 for processing of the next section candidate.

To generate alternative zones to the whole page frame (S202), a grid 184 (FIG. 16) may be employed. This method is useful as grids are generally used in the initial design of such complex layouts. The grid method works better than a greedy approach where the page frame width is reduced by a given difference and the result tested to determine if the zone corresponds to a regular section. Such a method can generate too many irrelevant zones, which may lead to incorrect column segmentation.

The exemplary layout grid 184 may be similar to a grid used in formatting, e.g., include a series of non-printing (imaginary) vertically-extending lines 186 (guide rules), which are horizontally spaced, and may be equally spaced, from each other. In formatting, such guide rules are used to define the placement of text and graphic elements that make up a printed page (see Roger C. Parker, The Aldus Guide to Basic Design, Aldus Corporation, 1988). The exemplary method can thus make use of the computation of these non-printing lines in order to find zones used to create sections. The guide rules 186 can be obtained by using page frame ratios. In this embodiment, the guide rules are positioned according to a ratio of the page frame width: If the ratio 1/m is used (m can have the same values as n), only the vertical positions $(1/m)*pfw$, $(2/m)*pfw$, ... $(m/m)*pfw$ are considered for the guide rules, where pfw corresponds to the page frame width.

Figure 16:
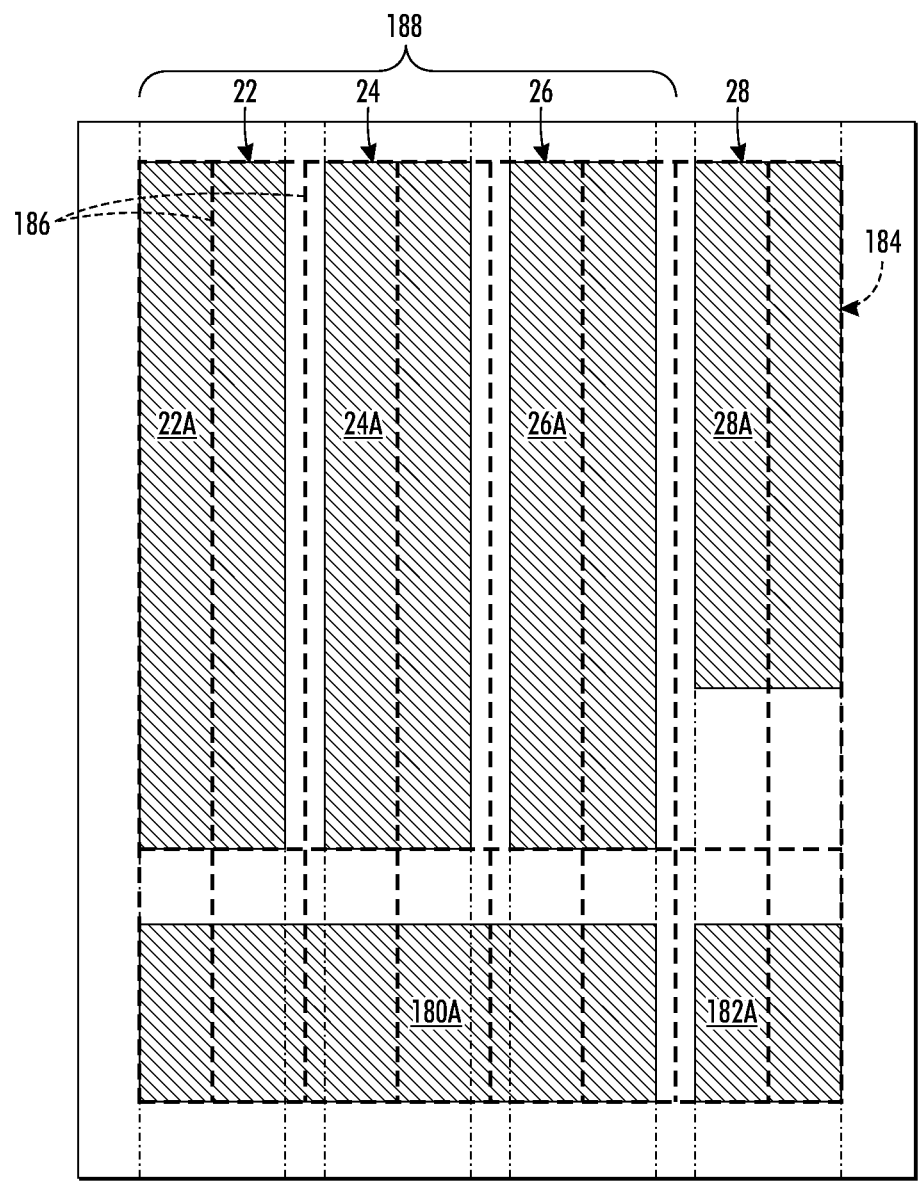
FIG. 16 illustrates the application of a grid to the elements of a page frame during the detection of sections of the page in accordance with another aspect of the exemplary embodiment.

The exemplary method seeks to find the correct (most likely) value of m, for example, by using a generate-and-test approach, as described below. Different values of m can be tested, e.g., from 2-20. FIG. 16 shows the case for the guide rules 186 when m=8. A regular section 188 of width 6/8 pfw is shown (this section would, of course, also be identified using m=4 where m is increased sequentially). In the exemplary embodiment, only vertical guide rules 186 (perpendicular to the x direction) are used (i.e., the horizontal guide rules commonly used in modular layout grids are not considered here). Method 2 may thus proceed shown in the exemplary pseudo code below:

---

Pseudo code: Method 2 input : a page, its elements (lElts) and its the page
    frame(pageFrame)
output: a set of text blocks
44.   For ratio in 1 .. 1/mMax:
45.       ListOfSections = findSection(pageFrame, ratio)
46.       sort sections in ListOfSections by width in decreasing order.
47.       Add the page frame as first section if not in the list
48.       For each section in ListOfSections and while lElts is not empty
49.           coveredElements = segmentWithSection(section, lElts)
50.           delete coveredElements from lElts

---

At S202, the vertical guide rules 186 for a given page 10 are found by testing different ratio values. Specifically, at line 44, the method iterates through ratios from 1−1/mMax (e.g., from 1-20). Then, the section candidates 188 in the page frame 18 are built using these vertical guide rules (line 45). A section candidate is defined as a zone delimited by two guide rules, i.e., extends from a left hand guide rule 186 to a right hand guide rule 186, which is spaced by one or more guide rules from the left hand guide rule. The set of section candidates is ordered, for example, in decreasing order of section width (i.e., the page frame 18 has the largest width and thus is placed first) (lines 46 and 47).

For each section candidate 188, etc., (while the list of elements is not empty, line 48) the section candidate is segmented into columns (line 49, using S108, as for Method 1, for example, but considering the section width rather than the page frame width in computing the column widths). If at S108, a section candidate does not correspond to a regular section (no column(s) with line elements), the section is ignored. If the section is regular, however, the section is validated as well as the column segmentation and the method proceeds to S110 and continues to S118. Covered elements corresponding to the regular columns then are eliminated from the set of elements i.e., are deleted from the list at line 50, as for line 16, for the remaining section candidates. In the case of FIG. 16, for example, the first section candidate is the entire page frame 18. In the exemplary iterative generate and test method, the segmentation proceeds from n=10 to n=4, where the elements in blocks 22A, 24A, 26A, 28A and 182A of the four columns are identified in this iteration, leaving elements in block 180A. The method returns to S108, for a subsequent iteration, where section 188 is considered and at n=1, a single one column block 180A is identified.

The segmentation step (S108) can be performed with any page layout analysis algorithm, e.g., as described for Method 1, above. If other methods are used, a test may need to be performed on the resulting segmentation to ensure that the segmentation corresponds to a regular section (columns of the same width covering the section width).

Exemplary pseudo code for finding sections (findSection in line 45 above) is given below:

| Pseudo code: findSection(zone,lElements,ratio): |
| --- |
| 51. x = zone.x |
| 52. z = zone.width |
| 53. colwidth = z*ratio |
| 54. for leftInc in 1.. colwidth − 1 |
| 55.     newX = x + leftInc *ratio |
| 56.     newWidth = z − (leftInc * ratio) |
| 57.     for rightInc in 0 .. colwidth − leftInc: |
| 58.         newW2 = newW − (ratio *rightInc) |
| 59.         newZone = zone(newX,zone.y, zone.h, newW2) |
| 60.         if there are q elements in lElements which start at newX |
| 61.         and r elements which end at newX+newW2: |
| 62.             add newZone in listZone |
| 63.             otherZones = findSection(newZone,lElements,ratio) |
| 64.             Add otherZones in listzones |
| 65. return listZone |

Specifically, the method takes the width of the zone and defines the column width as the zone width z multiplied by the ratio, e.g., if m is 9, the ratio is 1/9, and the column width is z/9 (line 53). Then the zone is reduced incrementally from the left and right by increments leftInc and rightInc of z/m and the width and locations of these new zones is computed (lines 54-59). Looking at the line elements, those that start at the left vertical edges or end at the right vertical edges of the new zone are identified. If there are at least a threshold q, r, respectively, of line elements which start and end at the guide rule edges of the new zone (lines 60 and 61), then the new zone is added to the list of zones. In one embodiment, at least one of q and r is at least 1 and in some embodiments, q=r. In order to find other zones (lines 62-64), the same method is used taking the current zone (new zone). The list of all the found zones are returned (line 65), and are used in Method 2 (Line 46).

Without intending to limit the scope of the exemplary embodiment, the following Example demonstrates the application of Method 2 to a pdf document containing page of a newspaper.

EXAMPLE

Figure 17:
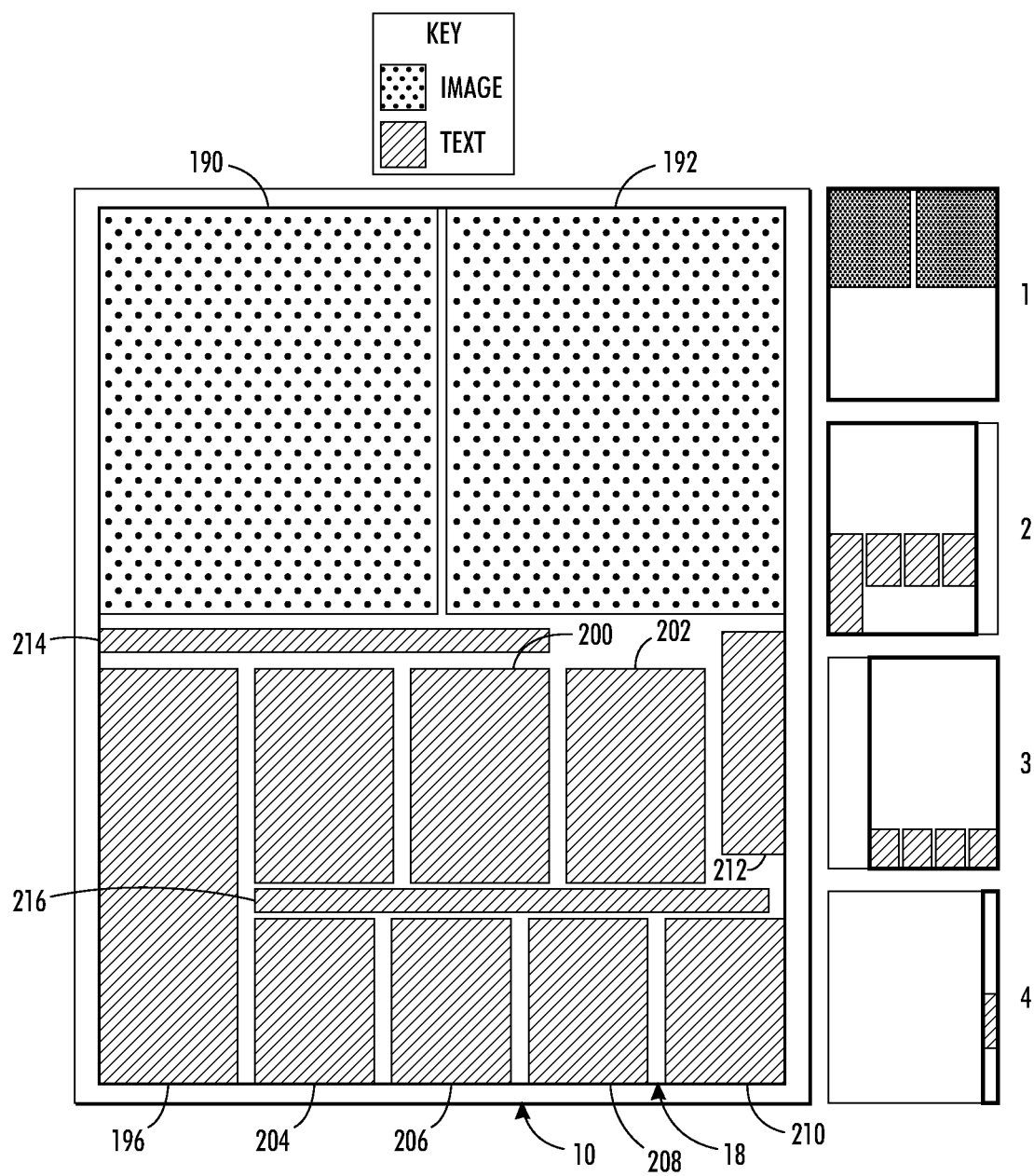
FIG. 17 illustrates one application of the method to an actual document page.

As an example of the operation of Method 2 on an actual document, FIG. 17 shows a page from the newspaper Liberation (page 5, published Oct. 27, 2009). For illustration purposes, the images of the page frame 18 are shown with dotted boxes and text is shown by crosshatched boxes. For this example, it was assumed that the page frame 18 had been found. Some elements were ignored for sake of readability (page headers, one subheading).

The FineReader 10 program was used for obtaining the elements.

1. Finding the Guide Rules for a Given Page

In order to determine the guide rules used in the page, a series of ratios (from 1/2 to 1/20), were systemically tested and the guide rules generated by each ratio assessed. For a given page, a guide rule is valid if at least q (or r) elements (at least one of q and r=1 in the example implementation) of the page start or end at the guide rule x-coordinate. Guide rules (vertical lines used to separate columns) are added, regardless of their height, when they are positioned at a ratio x-coordinate (which is generally the case).

2. Building the Section Candidates in the Page Frame Using the Guide Rules

Once a set of guide rules is found for a page, all the possible section candidates using these rules are generated in a combinatorial manner. Each section candidate is defined as a zone delimited by two guide rules.

The set of section candidates is sorted by section width in a decreasing order. The page frame itself is systematically added if not present in the list (at the first place, since its width is the largest possible one). Table 1 shows the first sections generated for this example.

TABLE 1

| The 10 broadest zones generated |||
| --- | --- | --- |
| Zones | (top left) X | Width |
| 1 | 64.0 | 660.0 |
| 2 | 64.0 | 589.0 |
| 3 | 64.0 | 534.0 |
| 4 | 213.0 | 511.0 |
| 5 | 64.0 | 440.0 |
| 6 | 213.0 | 440.0 |
| 7 | 64.0 | 403.0 |
| 8 | 213.0 | 385.0 |
| 9 | 344.0 | 380.0 |
| 10 | 363.0 | 361.0 |

3. Generating Possible Segmentations for a Given Section

This was performed by iterating over the list of sections, starting with the broadest one, and applying S108 to it as described for Method 1. If the current section candidate does correspond to a regular section, Method 1 returns a set of columns, and a list of the elements that are not contained in these columns (S110). If Method 1 does not succeed in segmenting this zone, all the elements are returned to the pool of remaining elements. The remaining elements are considered for the next iteration.

Considering Table 1, Line 1 corresponds to the section (1) shown in FIG. 17 where the entire page frame width is taken as section. Only a two-column section, corresponding to the two images 190, 192, is found in this iteration.

Then considering a ratio of /9, sections (2) and (3) are considered. Line 2 corresponds to the second section (2), which results in the processing of text blocks 196, 198, 200, 202. Line 3 does not correspond to a section, and then does not generate a segmentation. Line 4 corresponds to section (3). For section (2), a four column structure is found which results in the identification of text blocks 196, 198, 200, 202. Similarly, for section (3), a four column structure is found which results in the identification of text blocks 204, 206, 208, 210. The section (4) corresponds to a one-column section which contains the captions of the images in block 212. Section (4) is not shown in the table. This is because its width is relatively small. Thus, this section occurs in a lower position in the ordering.

The method thus successfully identifies the columnar portions of the page. The remaining elements 214, 216 (two horizontal bars), correspond to titles and can be separately extracted.

As can be seen from the description above, the exemplary method uses parameters which are very different from existing methods. No setting is required to estimate the minimal gutter size or the column width. Parameters are mainly used to delimit the solution space to make computation easier. Two parameters used in the present exemplary method are the set of numbers n of columns tested (see Method 1 algorithm, line 7), and the values for the candidate gutter widths (Method 1 algorithm, line 22). A parameter used to cope with noise (from OCR, or from the computation of previous processing steps such as the page frame) is the threshold used to compare two values. In the exemplary embodiment, two values are considered the same if they are within 5 points of each other, in the case of PDF files). All other values used as thresholds are automatically computed.

Meunier uses very different criteria than those used in the exemplary embodiment to decide where to cut a page (and then create columns). The present method combines the use of page frame with ratios. Existing methods can, of course, be used in the present method for identification of elements, such as vertical cuts and whitespace generation, but their use is guided, in the present method, by the use of ratios. The integration of the present method involving the page frame and ratios is possible in many existing solutions. Meunier, for example, strongly depends on parameter tuning. Manual tuning allows for good results in Meunier, but can be time consuming. Accordingly, one embodiment of the present method is to automatically propose correct parameter values for the method of Meunier. Some positive tests have been performed with Meunier's method to generate automatically the key parameters used in Meunier (numbers of columns, gutter width) using the present method.

In existing methods, the value of the gutter (its width) is usually based on the inter-word space. An example of where this fails is where a two-column text (e.g., footnotes) uses a small font size, and its gutter is smaller than the computed inter-word space for which the main text mostly contributes (its font size being larger, the inter-word space is larger than the one for the footnote section). Existing methods fail to detect a gutter in this case as it is smaller than the threshold. The existing method is not constrained to requiring gutters to be larger than an inter-word space. For example, the minimum gutter tested can be the smallest value detectable in the processed document, such as one point in a PDF file.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for segmenting a document comprising:
identifying a rectangular page frame using information from multiple pages of a document;
matching the page frame to a page of the document;
identifying elements within the matched page frame;
for a zone of the document page having a zone width and comprising a set of the elements, the zone comprising at least a portion of the page frame width:
a) for a first iteration:
segmenting the zone regularly into a number of candidate columns, a width of each of the candidate columns being function of the number of the candidate columns and the zone width;
for each of the candidate columns, identifying the elements in the set which are within the candidate column;
where the candidate columns meet a threshold for identified elements and a gutter is found which spaces the candidate columns, assigning, to a set of segmented columns, those elements in the set which are within the segmented columns, and identifying remaining elements in the set which are not covered by the segmented columns, the segmented columns corresponding in number to the number of candidate columns and each segmented column being spaced by the computed gutter;
b) where there are remaining elements after a), performing at least one of:
i) at least one subsequent iteration which includes repeating a), wherein in each subsequent iteration, the set of elements is the remaining elements in the set, and wherein the segmenting of the zone regularly into a number of candidate columns segments the zone into a different number of candidate columns from the first iteration and all other subsequent iterations, and
ii) considering the zone as a single segmented column only, identifying the elements in the set which are within the single segmented column; and
where there are remaining elements in the set after a) and b), providing for a) and b) to be performed for at least one subsequent zone of the page, wherein for each subsequent zone, the set of elements includes remaining elements not covered by the segmented columns identified for any of the preceding zones.

2. The method of claim 1, wherein at least one of a) and b) is performed with a computer processor.

3. The method of claim 1, wherein the zone comprises the entire page frame width, the method optionally comprising after b), repeating a) and b) for at least one zone having a width which is less than the page frame width for remaining elements.

4. The method of claim 1, wherein the computing of the page frame comprises:
for each of a set of pages of the document which includes the page, each document page having at least one detected element:
determining dimensions of a bounding box which encompasses the detected elements of the page, and
determining margin dimensions, based on a position of the bounding box on the page;
with a computer processor, computing a page frame as a combination of bounding box dimensions and margin dimensions, based on frequencies of the bounding box dimensions and margin dimensions computed for the set of pages; and
matching the computed page frame to pages of the set of document pages to detect page frames for the matched pages.

5. The method of claim 1, further comprising:
testing a plurality of ratios of the page frame width to identify zones of the page, each zone having a first edge and a second edge spaced from the first edge and wherein elements from the set of elements are aligned with at least one of the edges of the zone, each zone having a zone width between the first and second edges which is a function of one of the plurality of ratios;

wherein in the providing for a) and b) to be performed for a plurality of zones, the zones comprise the identified zones of the page.

6. The method of claim 5, wherein the testing of ratios includes for each ratio in the set of ratios, dividing the page frame equally by a number of guide rules based on the ratio and testing pairs of the guide rules to identify the zones.

7. The method of claim 1, wherein the set of elements comprises line elements, each line element comprising text.

8. The method of claim 7, further comprising identifying a reading order for the line elements assigned to blocks of the columns based on locations of the blocks on the page.

9. The method of claim 1, wherein a preset maximum number of candidate columns is established, the first iteration a) including segmenting the zone into the preset maximum number of candidate columns, and wherein at each subsequent iteration in b(i), the number of candidate columns is reduced.

10. The method of claim 9, wherein the preset maximum number of candidate columns is at least three.

11. The method of claim 10, wherein the preset maximum number of candidate columns is at least five.

12. The method of claim 1, wherein at each subsequent iteration, the number of candidate columns is reduced.

13. The method of claim 12, wherein at each subsequent iteration, the number of candidate columns is reduced by 1.

14. The method of claim 1, further comprising identifying a set of section candidates of the page, each of the section candidates having a respective width, and for each of the section candidates, performing a) and b) while there are remaining elements.

15. The method of claim 14, wherein the identifying a set of section candidates of the page comprises applying at least one regular grid to the page, each regular grid comprising a set of spaced guide rules, and identifying section candidates whose width is each defined by respective pair of spaced first and second guide rules of the grid, whereby a plurality of the section candidates are each defined by a different pair of the spaced first and second guide rules.

16. The method of claim 15, wherein the applying at least one regular grid to the page comprises applying a plurality of grids, each of the grids having a different number of guide rules.

17. The method of claim 15, wherein for each of the identified section candidates, the section candidate has at least a threshold number of elements in the set of elements which are aligned with at least one of the spaced first and second guide rules.

18. The method of claim 1, further comprising testing a plurality of candidate gutter widths to identify an optimum gutter width from the tested candidate gutter widths, and providing for each segmented column to be spaced from an adjacent segmented column by the optimum gutter width.

19. The method of claim 18, further comprising evaluating the optimum gutter width to determine whether a threshold is satisfied, and if the threshold is not satisfied, no gutter is found.

20. The method of claim 1, wherein the assigning of elements in the set to the segmented columns comprises assigning elements to respective blocks of the segmented columns, each segmented column comprising at least one block, wherein rules are provided for determining at least one of:

an end of a block of a segmented column, and
a start of a subsequent block in the same segmented column.

21. A system comprising:
a page frame detection component which, for each of a set of pages of an input document, assigns a page frame, the page frame assigned to the page being based on bounding boxes of detected elements for multiple pages of the document, the page frame detection component identifying elements from the detected elements for the page which are within the identified page frame, a zone of the document page having a zone width which is computed based on the page frame width;
a segmentation component which, for the zone of the document page having the zone width and comprising a set of the identified elements:
  a) for a first iteration:
    segmenting the zone regularly into a number of candidate columns, a width of each of the candidate columns being function of the number of the candidate columns and the zone width;
    for each of the candidate columns, identifying the elements in the set of the identified elements which are within the candidate column;
    where the candidate columns meet a threshold for identified elements and a gutter is found which spaces the candidate columns, assigning, to a set of segmented columns, those elements in the set of the identified elements which are within the segmented columns, and identifying remaining elements in the set of identified elements which are not covered by the segmented columns, the segmented columns corresponding in number to the number of candidate columns and each segmented column being spaced by the computed gutter; and
  b) where there are remaining elements in the set of the identified elements after a), performing at least one of:
    i) at least one subsequent iteration which includes repeating a), wherein in each subsequent iteration, the set of the identified elements is the remaining elements in the set of the identified elements, and wherein the segmenting of the zone regularly into a number of candidate columns segments the zone into a different number of candidate columns from the first iteration and all other subsequent iterations, and
    ii) considering the zone as a single segmented column only, identifying the elements in the set of the identified elements which are within the single segmented column; and
a processor in communication with the memory which implements the segmentation component.

22. The method of claim 1, further comprising:
assigning a page frame to each of a set of the pages of the input document based on bounding boxes of the detected elements for multiple pages of the document;
for each page in the set, identifying a set of elements from the detected elements which are within the assigned page frame the zone having a width which is computed based on the page frame width.

23. A system comprising:
a page frame detection component which assigns a page frame to each of a set of pages of an input document based on bounding boxes of detected elements for multiple pages of the document and identifies elements from the detected elements for each page in the set of pages which are within the identified page frame, a zone of the page having a width which is computed based on the page frame width;

a segmentation component which, for the zone of the document page having the zone width and comprising a set of the identified elements:

a) for a first iteration:

segmenting the zone regularly into a number of candidate columns, a width of each of the candidate columns being function of the number of the candidate columns and the zone width:

for each of the candidate columns, identifying the elements in the set of the identified elements which are within the candidate column;

where the candidate columns meet a threshold for identified elements and a gutter is found which spaces the candidate columns, assigning, to a set of segmented columns, those elements in the set of the identified elements which are within the segmented columns, and identifying remaining elements in the set of identified elements which are not covered by the segmented columns, the segmented columns corresponding in number to the number of candidate columns and each segmented column being spaced by the computed gutter; and b) where there are remaining elements in the set of the identified elements after a), performing at least one of:

i) at least one subsequent iteration which includes repeating a), wherein in each subsequent iteration, the set of the identified elements is the remaining elements in the set of the identified elements, and wherein the segmenting of the zone regularly into a number of candidate columns segments the zone into a different number of candidate columns from the first iteration and all other subsequent iterations, and ii) considering the zone as a single segmented column only, identifying the elements in the set of the identified elements which are within the single segmented column;

a testing component for:

iteratively testing each of a set of n-candidate columns to identify an optimum width for a gutter which spaces the n candidate columns based on positions of remaining elements from the set of elements which are within the zone, and while there are remaining elements in the set which are within the zone and which were not covered by a column in a prior iteration, identifying remaining elements from the set of elements that are each covered by of one of n segmented columns, each of the n segmented columns being spaced by the gutter of the optimum width, except for when n=1; and an output component which outputs information based on the elements that are covered by respective segmented columns; and a processor in communication with the memory which implements the segmentation component.

24. The method of claim 1, wherein the candidate columns are the same width, a gutter is located between each pair of adjacent candidate columns, and the sum of the widths of the candidate columns and gutters equals the zone width.

25. The method of claim 7, wherein the gutter is found by:

computing, for each of a set of candidate gutters, a candidate gutter position for each candidate gutter and for each of the candidate columns based on the number of candidate columns and the candidate gutter width;

for each column and for each line, computing a difference $\Delta$ from the candidate gutter position to a starting element of the column at that line;

constructing a histogram of the differences $\Delta$; and identifying a gutter from the set of candidate gutters by comparing the histogram of the differences $\Delta$ of the candidate gutters.

* * * * *